US011648963B2

(12) United States Patent
Uraki

(10) Patent No.: US 11,648,963 B2
(45) Date of Patent: May 16, 2023

(54) DRIVING CONTROL APPARATUS FOR AUTOMATED DRIVING VEHICLE, STOP TARGET, AND DRIVING CONTROL SYSTEM

(71) Applicant: Toyota Jidosha Kabushiki Kaisha, Toyota (JP)

(72) Inventor: Takeshi Uraki, Yokkaichi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 17/034,879

(22) Filed: Sep. 28, 2020

(65) Prior Publication Data

US 2021/0094580 A1 Apr. 1, 2021

(30) Foreign Application Priority Data

Sep. 30, 2019 (JP) .............................. JP2019-178781

(51) Int. Cl.
| | | |
|---|---|---|
| B60W 60/00 | (2020.01) | |
| G01S 17/931 | (2020.01) | |
| G01S 17/89 | (2020.01) | |
| G01S 7/481 | (2006.01) | |
| G01S 15/08 | (2006.01) | |
| G01S 15/931 | (2020.01) | |
| G01S 17/10 | (2020.01) | |
| G06V 20/58 | (2022.01) | |
| G06V 20/64 | (2022.01) | |

(52) U.S. Cl.
CPC ....... *B60W 60/0025* (2020.02); *G01S 7/4817* (2013.01); *G01S 15/08* (2013.01); *G01S 15/931* (2013.01); *G01S 17/10* (2013.01); *G01S 17/89* (2013.01); *G01S 17/931* (2020.01); *G06V 20/582* (2022.01); *G06V 20/64* (2022.01); *B60W 2420/52* (2013.01); *G01S 2015/932* (2013.01)

(58) Field of Classification Search
None
See application file for complete search history.

(56) References Cited

U.S. PATENT DOCUMENTS

| | | |
|---|---|---|
| 11,417,111 B2 * | 8/2022 | Aceti ................... G06V 10/143 |
| 2009/0228204 A1 | 9/2009 | Zavoli et al. |
| 2016/0238703 A1 | 8/2016 | Liu et al. |

FOREIGN PATENT DOCUMENTS

| | | |
|---|---|---|
| CN | 101952688 A | 1/2011 |
| CN | 105893931 A | 8/2016 |
| JP | H113495 A | 1/1999 |
| JP | 2008-087676 A | 4/2008 |
| JP | 2017-196962 A | 11/2017 |

* cited by examiner

*Primary Examiner* — Peter D Nolan
*Assistant Examiner* — Jacob Besteman-Street
(74) *Attorney, Agent, or Firm* — Dinsmore & Shohl LLP

(57) ABSTRACT

A LiDAR sensor three-dimensionally scans laser light outward of the vehicle and receives reflected light. A LiDAR data analyzer groups three-dimensional points of the reflected light acquired by the LiDAR sensor into clusters. A precise docking control start determination unit compares shapes and reflectance distributions between at least one of the clusters obtained by the LiDAR data analyzer and a reference cluster representing a stop target to determine whether or not the at least one cluster includes the stop target.

1 Claim, 19 Drawing Sheets

DRIVING CONTROL APPARATUS FOR AUTOMATED DRIVING VEHICLE, STOP TARGET, AND DRIVING CONTROL SYSTEM

CROSS REFERENCE TO RELATED APPLICATION

This application claims priority to Japanese Patent Application No. 2019-178781 filed on Sep. 30, 2019, which is incorporated herein by reference in its entirety including the specification, claims, drawings, and abstract.

TECHNICAL FIELD

The present specification discloses a driving control apparatus for an automated driving vehicle, a stop target, and a driving control system.

BACKGROUND

Automated driving vehicles that automatically control steering and speed of vehicles are known. An automated driving vehicle includes various sensors to estimate the vehicle location and recognize peripheral environments.

An automated driving vehicle includes, for example, a LiDAR (Light Detection and Ranging) sensor for measuring a distance to an obstacle in the vicinity. A LiDAR sensor measures a distance to a peripheral object using laser light such as infrared rays. For example, a LiDAR sensor scans infrared laser light three-dimensionally (in the horizontal and vertical directions) to obtain three-dimensional point group data of the vicinity of the vehicle.

An automated driving vehicle further includes a camera that captures an image of the surrounding area. An image captured by the camera is analyzed with a deep learning technique such as SSD (Single Shot Multibox Detector), for example, so that attributes of various objects (vehicles, passengers, structures, etc.) included in the image can be recognized.

By combining the three-dimensional point group data obtained by the LiDAR sensor with the image recognition by the camera, it is possible to determine the distance of objects from the vehicle and attributes of the objects.

If such an automated driving vehicle is public transportation such as a passenger bus, it is necessary to stop the vehicle beside a stop target such as a bus stop, as disclosed in JP H11-3495 A and JP 2017-196962 A. This stopping control is also referred to as precise docking control. Precise docking control requires driving control for allowing a space between the curb and an entrance step of the vehicle to be within a several centimeters, for example, to enable a wheelchair and the like to board or exit smoothly. To execute precise docking control, it is necessary to recognize a stop target ahead of the vehicle in the travelling direction.

Precise docking control of a vehicle starts when a stop target is recognized in a camera image, for example. In precise docking control, the three-dimensional point group data from the LiDAR sensor, for example, are used to determine the distance between the recognized stop target and the vehicle, and the steering angle and the speed of the vehicle are controlled in accordance with the distance.

If it is possible to recognize a stop target by a sensor other than the camera, in addition to the camera, an increase in the detection accuracy of the stop target is expected. Embodiments of the present disclosure are therefore directed toward providing an improved driving control apparatus for an automated driving vehicle, a stop target, and a driving control system, capable of recognition of a stop target using a LiDAR sensor.

SUMMARY

A driving control apparatus for an automated driving vehicle disclosed in the present specification includes a LiDAR sensor, an analyzer, and a determination unit. The LiDAR sensor is configured to three-dimensionally scan laser light outward of the vehicle and to receive reflected light. The analyzer is configured to group three-dimensional points of the reflected light acquired by the LiDAR sensor into clusters. The determination unit is configured to compare shapes and reflectance distributions between at least one of the clusters obtained by the analyzer and a reference cluster representing a stop target to determine whether or not the at least one cluster includes the stop target.

The above configuration is used to group the three-dimensional points acquired by the LiDAR sensor into clusters to enable recognition of the stop target by using the shape and the reflectance distribution of the clusters.

In the above configuration, the reference cluster may have a stripe configuration including repeated patterns of a plurality of regions in which adjacent regions have different reflectances with respect to the laser light.

The above configuration facilitates discrimination of the stop target from other objects, resulting in increased accuracy of recognition of the stop target.

In the above configuration, the reference cluster may include, as the stripe configuration, a high reflectance region having a relatively high reflectance with respect to the laser light and a low reflectance region having a relatively low reflectance with respect to the laser light. The high reflectance region and the low reflectance region may be alternately arranged repeatedly.

In the above configuration, the stripe configuration includes two types of zones: the high reflectance region and the low reflectance region. This increases a difference in reflectance between the regions (i.e., enhances the contrast), thereby facilitating recognition of the stop target from a distant place.

In the above configuration, the reference cluster may include, as the stripe configuration, a horizontal stripe configuration including the high reflectance region and the low reflectance region both extending horizontally. The high reflectance region and the low reflectance region may be alternately disposed repeatedly in a vertical direction.

The stop target typically has a vertically elongated configuration with the horizontal dimension smaller than the vertical dimension. When such a stop target and the corresponding reference cluster have a horizontal stripe configuration including the high reflectance region and the low reflectance that are alternately arranged repeatedly in the vertical direction, each stripe can have an increased width. This facilitates recognition of the stop target from a distant place accordingly.

In the above configuration, the reference cluster may have a surface shape of 0° to 180° of a circular cylindrical side face.

The stop target having a circular cylindrical shape reduces variations of the projection area caused by the imaging angle of the stop target. This requires that the reference cluster corresponding to the stop target should have only a surface shape of 0° to 180° of the circular cylindrical side face; that is, only a surface shape of the circular cylindrical side face as viewed from the front, eliminating the need to change the shape of the reference cluster depending on the imaging angle, for example.

A stop target disclosed in the specification is a stop target for an automated driving vehicle comprising a LiDAR sensor configured to three-dimensionally scan laser light outward of the vehicle and to receive reflected light. The stop target has a stripe configuration including repeated patterns of a plurality of regions in which adjacent regions have different reflectances with respect to the laser light.

A driving control system disclosed in the specification includes a stop target, and an automated driving vehicle to stop beside the stop target. The stop target has a stripe configuration including repeated patterns of a plurality of regions in which adjacent regions have different reflectances with respect to laser light. The automated driving vehicle includes a LiDAR sensor, an analyzer, and a determination unit. The LiDAR sensor is configured to three-dimensionally scan the laser light outward of the vehicle and to receive reflected light. The analyzer is configured to group three-dimensional points of the reflected light acquired by the LiDAR sensor into clusters. The determination unit is configured to compare shapes and reflectance distributions between at least one of the clusters obtained by the analyzer and a reference cluster representing a stop target to determine whether or not the at least one cluster includes the stop target.

The driving control apparatus for an automated driving vehicle, the stop target, and the driving control system disclosed in the specification enable recognition of a stop target using a LiDAR sensor.

BRIEF DESCRIPTION OF DRAWINGS

Embodiments of the present disclosure will be described by reference to the following figures, wherein.

DESCRIPTION OF EMBODIMENTS

Vehicle Configuration

The configuration of a vehicle 10 including a driving control apparatus according to the present embodiment will be described by reference to the drawings. In FIGS. 1 to 4, a direction along the length of a vehicle body is indicated by an axis denoted with a sign FR, a direction along the width of the vehicle is indicated by an axis denoted with a sign LH (Left Hand), and a direction along the vehicle height is indicated by an axis denoted with a sign UP.

The lengthwise axis FR and the widthwise axis LH both extend along the horizontal direction, and the vehicle height axis UP extends along the vertical direction. The forward direction of the vehicle body lengthwise axis FR corresponds to the frontward direction of the vehicle body; the forward direction of the widthwise axis LH corresponds to the leftward in the vehicle width direction; and the forward direction of the vehicle height axis UP corresponds to the upward direction. These three axes are orthogonal to each other.

In the following description, unless otherwise specified, frontward in the vehicle body lengthwise direction is simply referred to as "frontward" or "front", rearward in the vehicle body lengthwise direction is simply referred to as "rearward" or "rear", upward in the vehicle height direction is simply referred to as "upward", and downward in the vehicle height direction is simply referred to as "downward".

Figure 1:
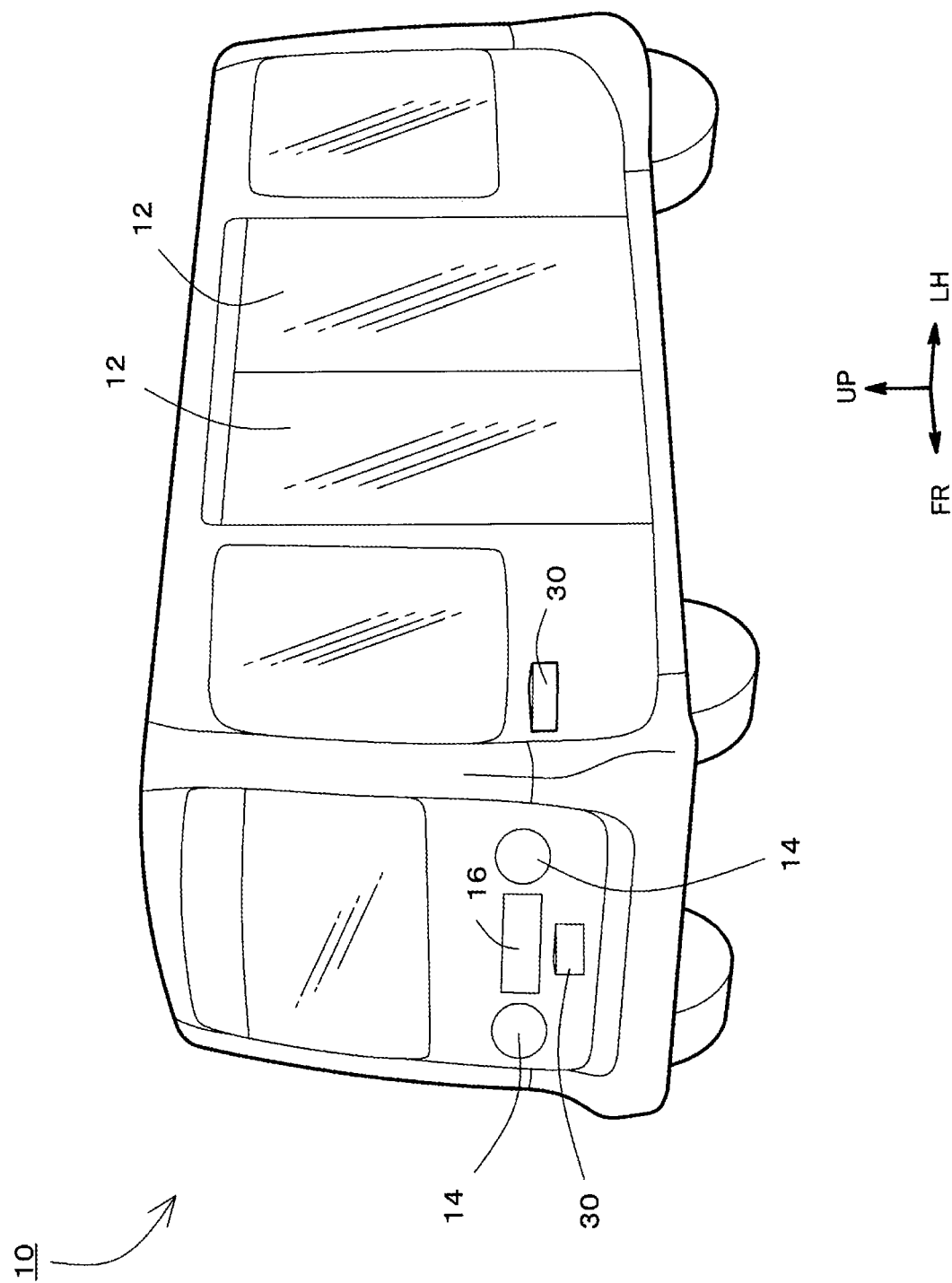
FIG. 1 is a perspective view illustrating an outer appearance of a vehicle.

FIG. 1 is a perspective view illustrating an outer appearance of the vehicle 10. Specifically, FIG. 1 illustrates a front face (front) and a left side face of the vehicle 10.

The vehicle 10 is an automated driving vehicle having automated driving functions. The vehicle 10 is capable of automated driving from level 0 (fully manual) to level 5 (fully autonomous) based on the automated driving standard of the Society of Automotive Engineers (SAE), for example. According to the SAE standard, for example, a driver's manipulation is at least partially required from level 0 to level 3. In level 4 (highly automated driving), full automated driving which does not require driver's manipulation operation is executed within a limited area (e.g., within a bus operation route). In level 5, automated driving (full autonomous operation) which does not require drivers under any conditions is executed.

The vehicle 10 is used as a passenger bus which travels along a predetermined route according to automated driving within a specific site with passengers being on board in the vehicle interior. During operation, the automated driving level is set to SAE level 4, for example.

The vehicle 10 is an electric car that uses a rotary electric machine as a drive source, for example. The vehicle 10 includes a main battery (not shown) installed to supply electric power to the rotary electric machine. The vehicle 10 is not limited to an electric car, and may be a hybrid vehicle including an internal combustion engine (engine) and a rotary electric machine as drive sources.

Referring to FIG. 1, the vehicle 10 includes entrance/exit doors 12 in the center of the left side face. The entrance/exit doors 12 are, for example, slidable double doors that move lengthwise of the vehicle in a slidable manner to open and close. The vehicle 10 is configured to travel on the left side of the road.

The vehicle 10 includes, on its front face, a pair of head lamps 14 (headlights). The vehicle 10 further includes, between the pair of head lamps 14, a destination and mode display 16 showing letters indicating a destination and an operation mode (e.g., automated driving or manual driving), for example. The destination and mode display 16 further shows message to passengers, such as "After You", when the vehicle 10 stops before a pedestrian crossing.

Figure 2:
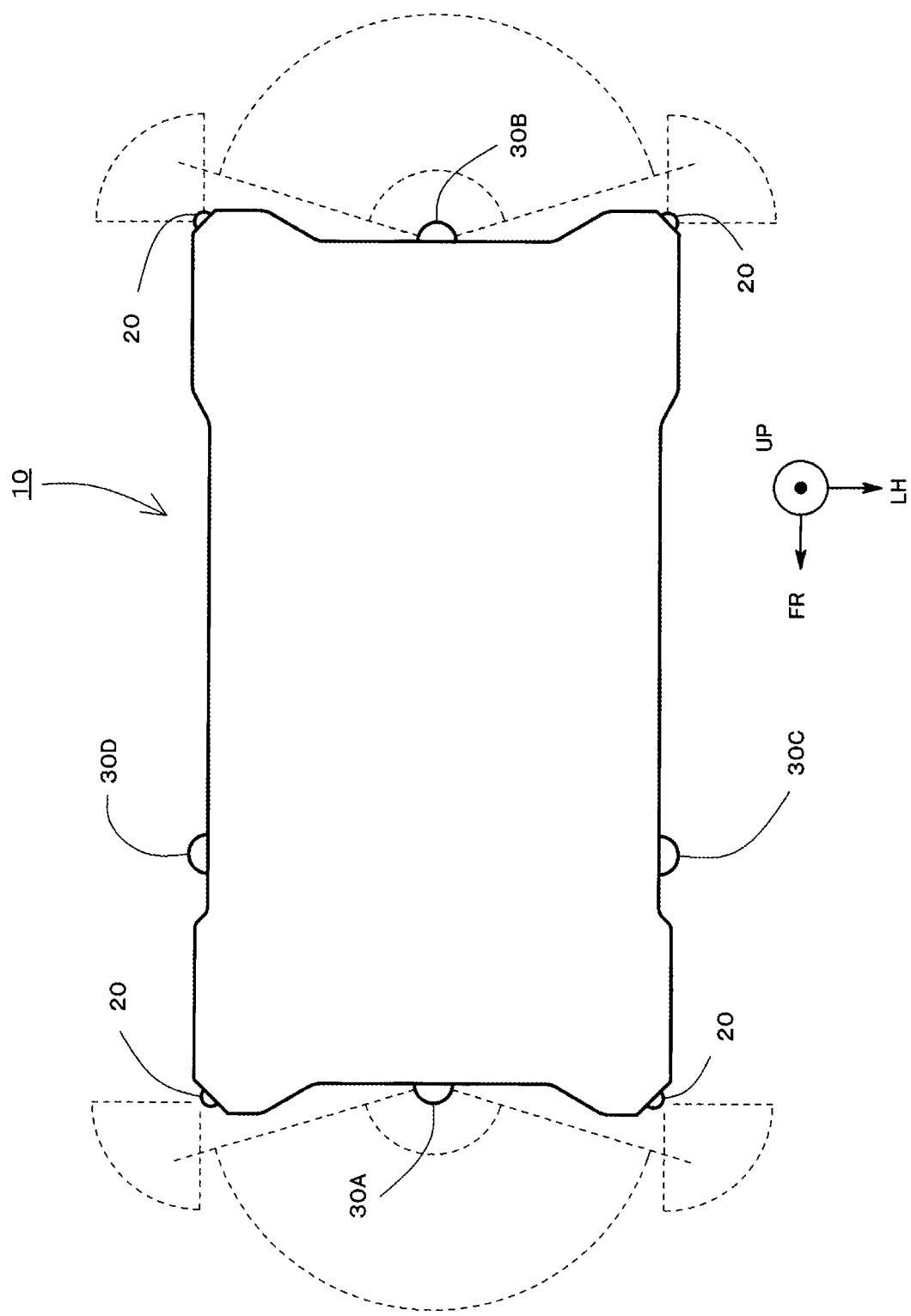
FIG. 2 is a plan view illustrating an outer appearance of a vehicle.

The vehicle 10 further includes a plurality of sensors to enable automated driving. Referring to FIG. 1 and FIG. 2, the vehicle 10 includes, on its front face, rear face, and side faces, sensor units 30 (30A to 30D). The vehicle 10 further includes clearance sensors 20 at the four corners of the vehicle 10.

The clearance sensors 20 may be sonar sensors, for example, and measure the distance between the vehicle 10 and surrounding objects. In executing precise docking which will be described below, for example, the clearance sensors 20 measure the distance between the vehicle 10 and the curb.

Figure 3:
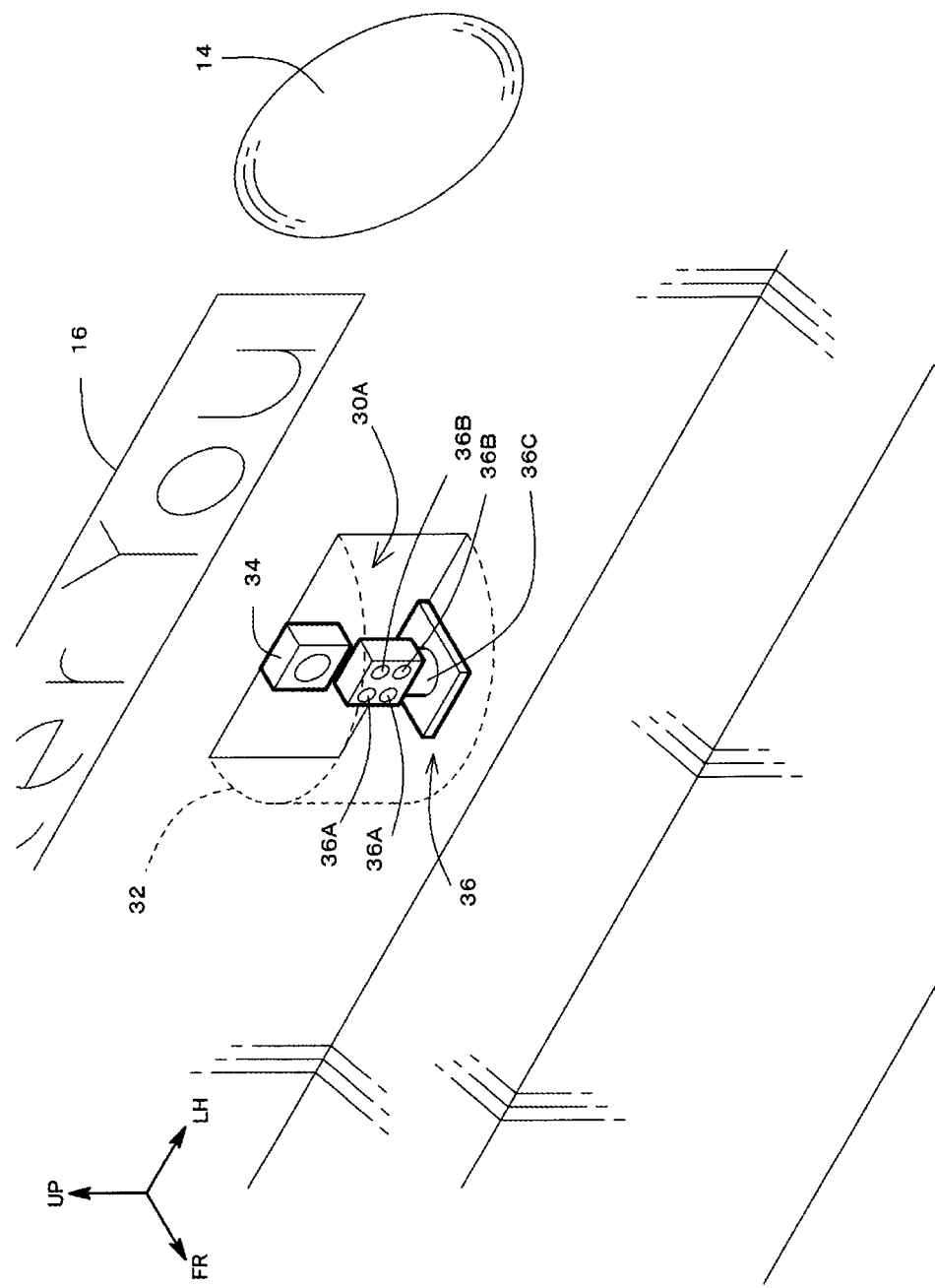
FIG. 3 is an enlarged perspective view of a sensor unit and its periphery on a front face of the vehicle.

FIG. 3 illustrates the sensor unit 30A disposed on the front face of the vehicle 10. The other sensor units 30B, 30C, and 30D are similarly configured. The sensor unit 30A protrudes from the vehicle front face toward outside the vehicle; that is, protrudes frontward of the vehicle. The sensor unit 30 includes a camera 34, a LiDAR sensor 36, and a casing 32 that houses these elements.

The casing 32 protects the camera 34 and the LiDAR sensor 36 against wind and rain or obstacles, for example, while securing their field of view. The casing 32 is composed of an optically transparent resin material, for example. The casing 32 is configured in a semicylindrical shape protruding from the vehicle front face toward the vehicle outside (frontward of the vehicle), for example.

The LiDAR sensor 36 is a sensor unit for automated driving which employs LiDAR; that is, a technique for measuring a distance to a surrounding object using laser light. The LiDAR sensor 36 includes an emitter 36A that emits infrared laser light outward, a receiver 36B that receives the reflected light, and a motor 36C that rotates the emitter 36A and the receiver 36B.

An irradiation plane of the emitter 36A and a receiving plane of the receiver 36B are parallel to each other and are aligned in the vehicle width direction and the vehicle length direction. The emitter 36A emits infrared laser light outward of the vehicle; that is, toward the region ahead of the vehicle 10. The emitter 36A may include a pulse laser light source that emits laser light of around 905 nm. The laser light emitted from the emitter 36A impinges onto an object located ahead of the vehicle 10, and the reflected light is received by the receiver 36B. The distance between the reflection point and the receiver 36B is determined based on time elapsed from light emission from the emitter 36A to light reception by the receiver 36B.

The motor 36C allows the emitter 36A and the receiver 36B to rotate about its vertical axis (UP axis) serving as a rotary axis. The motor 36C may be a servo motor, for example. The motor 36C allows the emitter 36A and the receiver 36B to scan horizontally, so that range for measuring the distance to an object in the region ahead of the vehicle 10 expands in the horizontal direction. An electromagnetic mirror may be used, in place of the motor 36C, to perform the horizontal scanning.

The emitter 36A and the receiver 36B may also be line sensors extending in the vertical direction (height direction). For example, a plurality of light sources (e.g., laser elements) of the emitter 36A are aligned in the vertical direction and a plurality of light receiving elements of the receiver 36B are also aligned in the vertical direction. The emitter 36A and the receiver 36B are arranged radially in the vertical direction such that laser light can be emitted radially and the reflected light can be received. Such an arrangement enables acquisition of the range data by vertical scanning.

Figure 4:
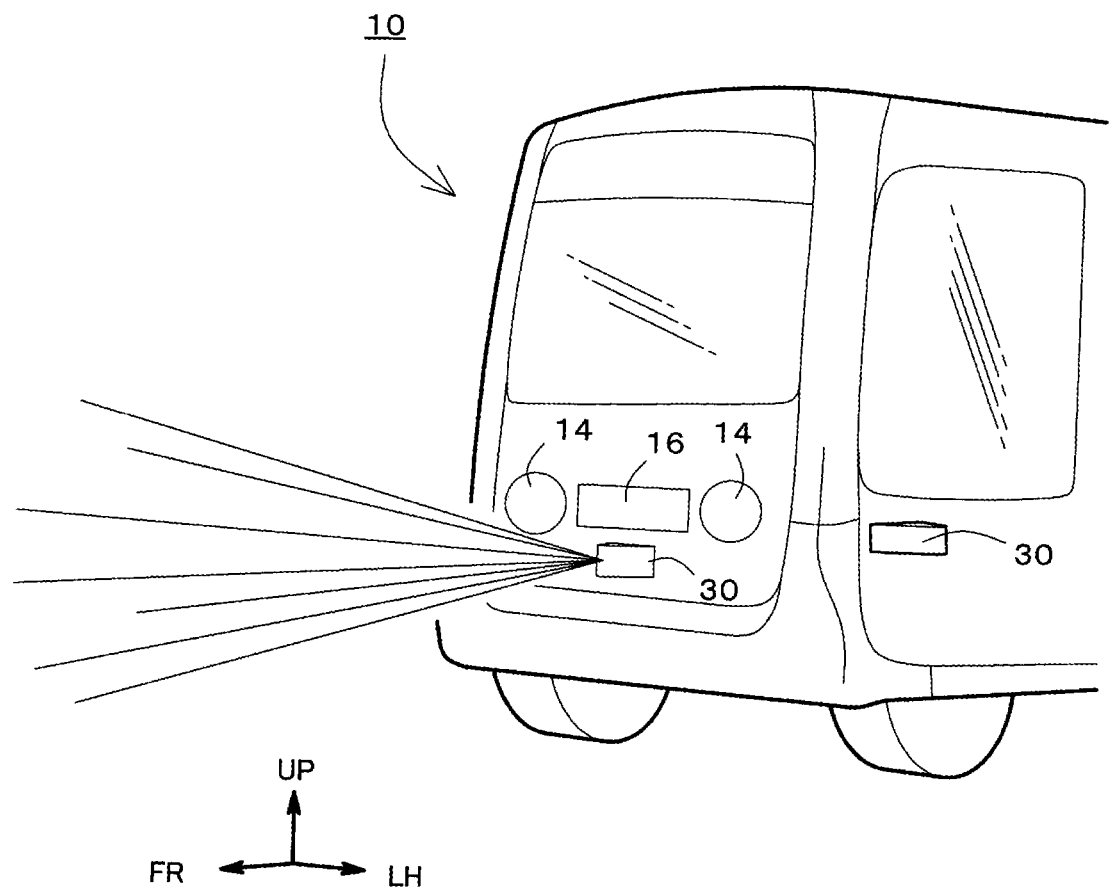
FIG. 4 illustrates an irradiation range of a LiDAR unit.
Figure 15:
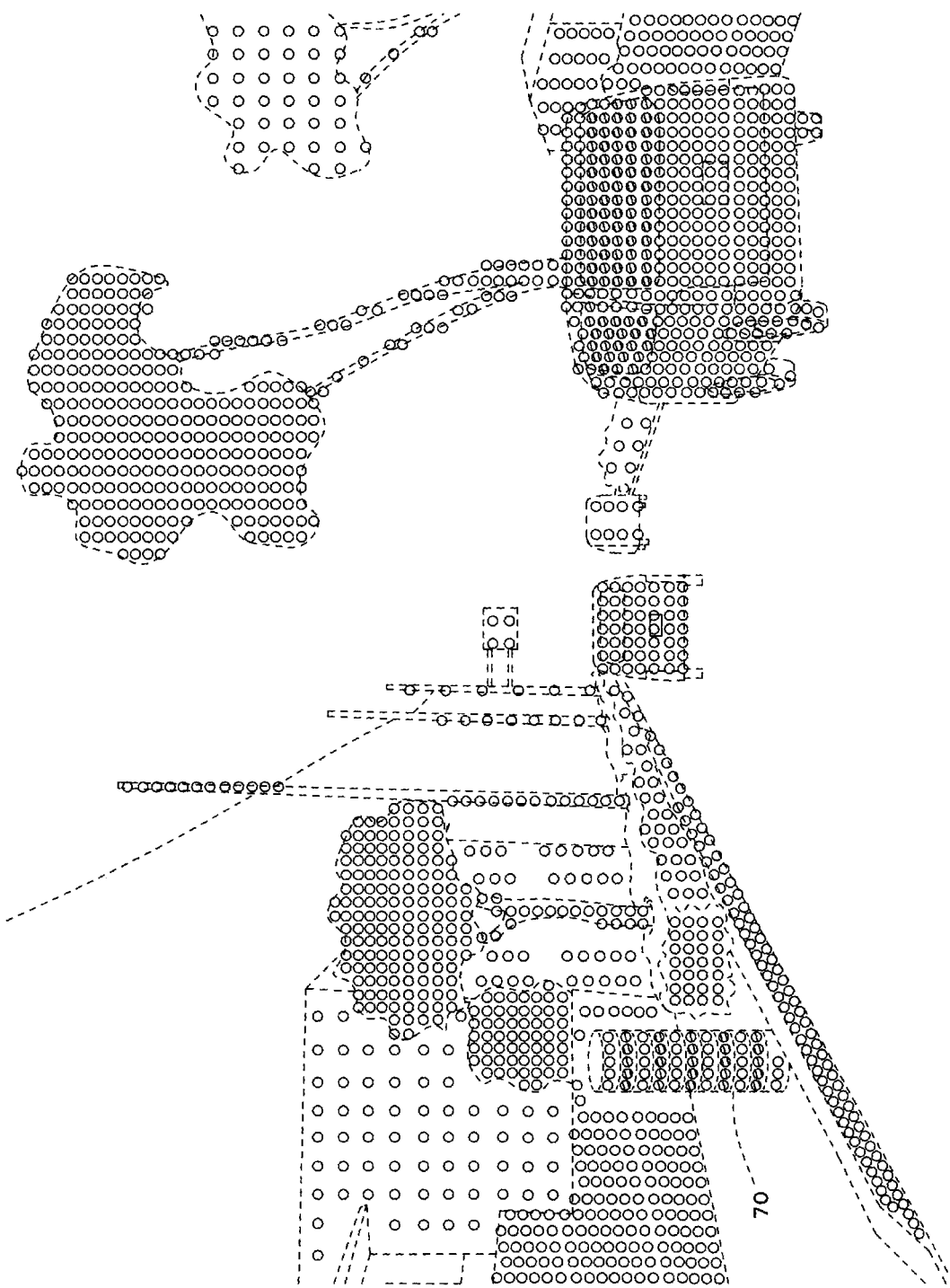
FIG. 15 illustrates three-dimensional point group data provided by a LiDAR sensor, which correspond to the scene illustrated in FIG. 14.

As described above, the LiDAR sensor 36 scans laser light outward of the vehicle in the horizontal and vertical directions; that is, three-dimensionally, and receives the reflected light, as illustrated in FIG. 4. Based on the irradiation angle and the light receiving angle (including the horizontal and vertical angles) and the time elapsed from laser light irradiation to reception of light, three-dimensional information of the reflection points; that is, the distance from the vehicle to the reflection points, can be obtained three-dimensionally, as the range data. Then, three-dimensional points as illustrated in FIG. 15 are determined by two-dimensionally obtaining the reflection points including the three-dimensional information. In FIG. 15, the reflection points are indicated with circles.

Each reflection point includes, in addition to the three-dimensional information, its reflectance data. As will be described below, in recognizing a stop target 70, a reflectance distribution of clustered three-dimensional points is compared with a reflectance distribution of a reference cluster 80 representing the stop target 70.

The camera 34 captures an image of the same view as the LiDAR sensor 36. The camera 34 includes an image sensor such as a CMOS sensor or a CCD sensor, for example. The image captured by the camera 34 (captured image) is used for automated driving control. For example, the image captured by the camera 34 is analyzed to detect objects included in the image and recognize the attribute of the objects, as described below.

Figure 5:
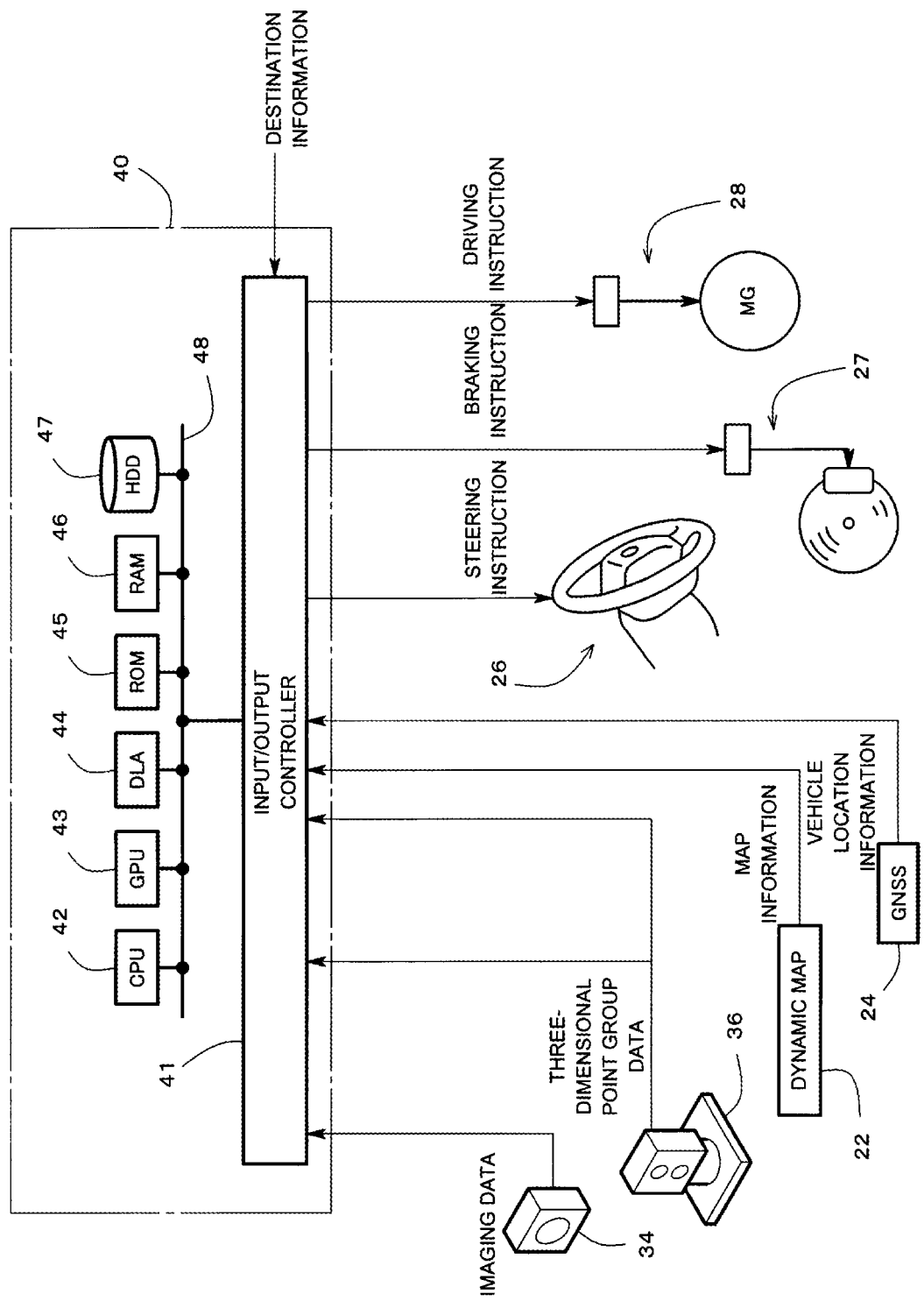
FIG. 5 is a hardware structural view illustrating a configuration of a driving control apparatus for an automated driving vehicle according to an embodiment.

FIG. 5 illustrates a driving control apparatus of an automated driving vehicle according to the present embodiment. The driving control apparatus includes the camera 34, the LiDAR sensor 36, a dynamic map 22, a navigation system 24, a steering mechanism 26, a braking mechanism 27, a driving mechanism 28, and a control unit 40. The driving control apparatus is mounted on the vehicle 10.

The dynamic map 22 is a three-dimensional map that stores locations and three-dimensional configurations of roads, footpaths, surrounding structures, traffic signals, and stop lines, for example. The navigation system 24 performs positioning using an artificial satellite, and a GNSS (Global Navigation Satellite System) is used, for example. As will be described below, the navigation system 24 and the dynamic map 22 are used to enable estimation of the location of the vehicle with accuracy within a range of positioning errors of the artificial satellite.

The steering mechanism 26 is used to manipulate a steering wheel, for example, and includes a steering motor, for example. When a steering instruction is supplied from the control unit 40 to the steering motor, the steering angle of the vehicle 10 is controlled.

The braking mechanism 27 is used to manipulate a brake mechanism, and includes, for example, an actuator for a master cylinder that controls the oil pressure of the brake. Upon receiving a braking instruction from the control unit 40 by the actuator, the vehicle 10 decelerates.

The driving mechanism 28 is used to control driving force of a rotary electric machine which is a drive source of the vehicle 10, and includes, for example, an inverter that controls the driving force of the rotary electric machine. When a driving instruction is supplied from the control unit 40 to the inverter, the driving force of the vehicle 10 is controlled.

The control unit 40 may be an electronic control unit (ECU) of the vehicle 10, for example, and is composed of a computer. The control unit 40 includes an input/output controller 41 that controls input/output of data. The control unit 40 further includes, as operation elements, a CPU 42, a GPU (Graphics Processing Unit) 43, and a DLA (Deep Learning Accelerator) 44. The control unit 40 also includes, as storage units, a ROM 45, a RAM 46, and a hard disk drive 47 (HDD). These structural elements are coupled to an internal bus 48.

Figure 13:
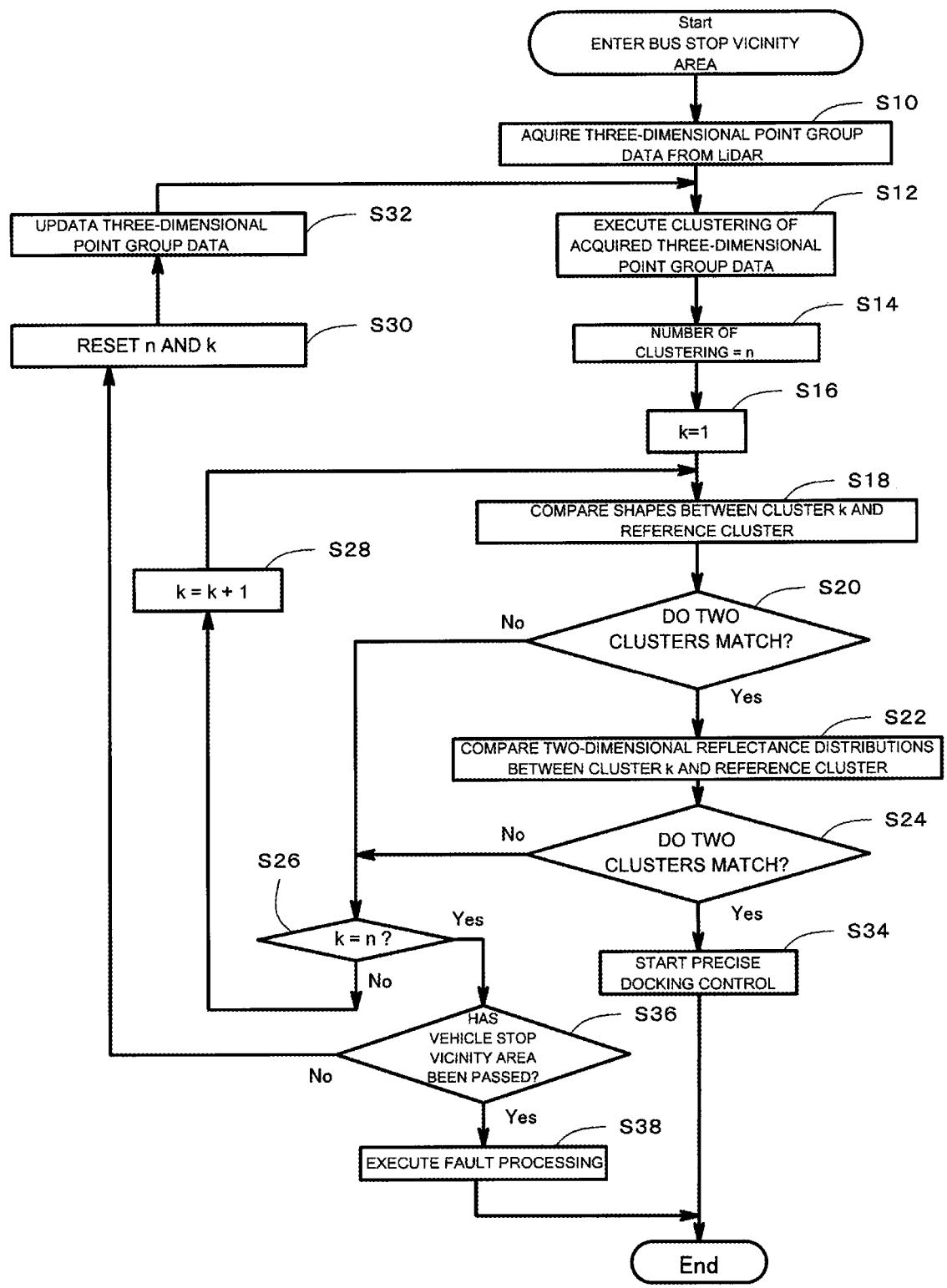
FIG. 13 illustrates a precise docking control start determination flow performed by a driving control apparatus for an automated driving vehicle according to an embodiment.

At least one of the ROM 45 and the hard disk drive 47 which are storage devices stores a program for executing automated driving control including precise docking control. At least one of the ROM 45 and the hard disk drive 47 further stores a program for executing a precise docking control start determination flow as illustrated in FIG. 13.

Figure 6:
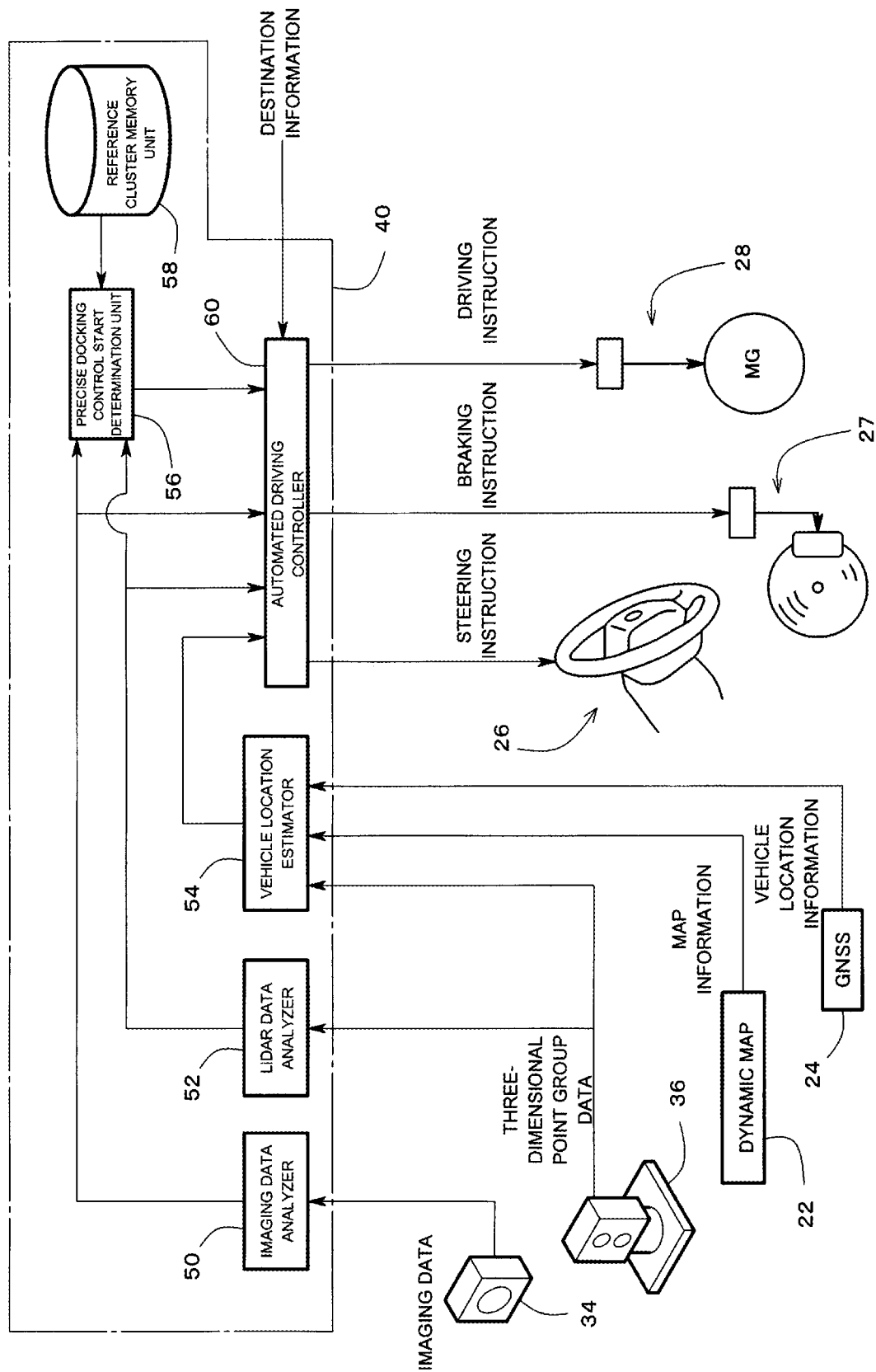
FIG. 6 illustrates functional blocks of a control unit.

To execute programs of the automated driving control and the precise docking control start determination flow, the control unit 40 includes function blocks as illustrated in FIG. 6, including an imaging data analyzer 50, a LiDAR data analyzer 52, a vehicle location estimator 54, a precise docking control start determination unit 56, a reference cluster memory unit 58, and an automated driving controller 60. Operation of these function blocks will be described below.

Stop Target

FIG. 7 to FIG. 12, FIG. 18, and FIG. 19 illustrate stop targets 70 and corresponding reference clusters 80. The stop target 70 and the driving control apparatus mounted on the vehicle 10 constitute a driving control system for an automated driving vehicle according to the present embodiment.

FIG. 7, FIG. 8, FIG. 9, FIG. 11, FIG. 12, FIG. 18, and FIG. 19 each show a vertical axis V and a horizontal axis H. The vertical axis V is parallel to the vehicle height axis UP of the vehicle, and the horizontal axis H extends within the same plane (within the horizontal plane) as the lengthwise axis FR and the widthwise axis LH.

Figure 7:
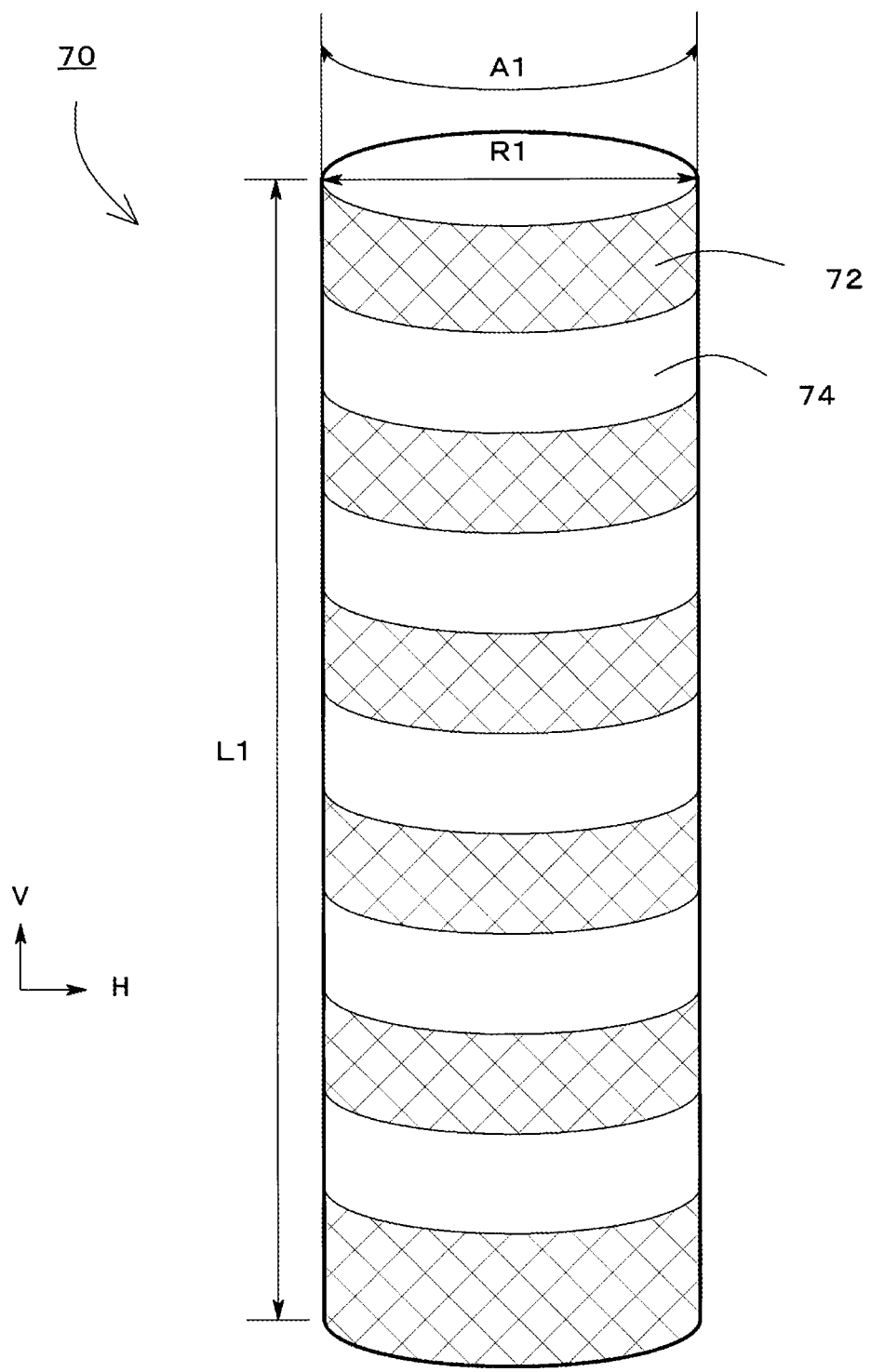
FIG. 7 illustrates a stop target according to an embodiment.

Referring to FIG. 7, the stop target 70 is a so-called bus stop and is a target which indicates a stop position of the vehicle 10. The outer face (exposed face) of the stop target 70 may have a stripe configuration including repeated patterns of a plurality of regions in which adjacent regions have different reflectances with respect to laser light.

The outer face (exposed face) of the stop target 70 includes, as a stripe configuration, high reflectance regions 72 with relatively high reflectance with respect to the infrared laser light emitted from the LiDAR sensor 36 and low reflectance regions 74 with relatively low reflectance, which are alternately arranged in a repeated manner, for example. In other words, the outer face (exposed face) includes a plurality of pairs, each including the high reflectance region 72 and the low reflectance region 74.

The stripe configuration formed of two types of zones, the high reflectance region 72 and the low reflectance region 74, can assume a significant difference in reflectance among the regions (that is, can have high contrast). This facilitates recognition of the stop target from a distant place.

The exposed face of the stop target 70 may include a horizontal stripe configuration, for example. More specifically, the exposed face includes the high reflectance region 72 and the low reflectance region 74 both extending in the horizontal direction and arranged alternately in the vertical direction.

Typically, a bus stop has a vertical dimension L1 which is greater than a horizontal dimension R1, as illustrated in FIG. 7. The horizontal stripe configuration in which stripe patterns are deployed along the longitudinal direction has a greater number of patterns than the number of patterns in the vertical stripe configuration in which stripe patterns are deployed along the lateral direction, and can have an increased width (stripe width) for each stripe.

The stop target having an increased number of stripe patterns can be easily extracted from among surrounding objects. Further, the stop target 70 with a greater stripe width can be recognized from a distant place.

The stripe width is determined in light of the specifications of the LiDAR sensor 36 (see FIG. 6) and the start point of the precise docking control. For example, the vertical angle resolution θ of the LiDAR sensor 36 and the distance r with respect to the stop target 70 at which the precise docking control starts are used to determine a space z between the laser light beams in the vertical direction at the distance r from the following equation: $z = 2r \times \tan(\theta/2)$.

To obtain the reflection points in the high reflectance region 72 and the low reflectance region 74 of the stop target 70 from the distance r, the stripe width needs to have the minimum value $w_{min}$ that is equal to or greater than z. Assuming that the vertical angle resolution θ is 0.1°, and the distance r from the vehicle 10 (more specifically, the LiDAR sensor 36) to the stop target 70, where the precise docking control starts, is 100 m, for example, z≈17 cm. Therefore, the minimum value $w_{min}$ of the stripe width is 17 cm. The high reflectance region 72 and the low reflectance region 74 may have an equal stripe width, and the stripe widths may also be equal among the patterns.

The maximum value $W_{max}$ of the stripe width is determined based on the height L1 of a pattern plane of the stop target 70 where the stripe configuration can be formed and the number m of repetition of patterns formed by pairs of the high reflectance region 72 and the low reflectance region 74. For example, the stripe width w, the pattern plane height L1, and the pattern repetition number m have a relationship of 2w×m≤L1. Assuming that the pattern repetition number is 5 and the pattern plane height L1 is 2 m, w≤20 cm, so that the maximum value $W_{max}$ of the stripe width is 20 cm.

The stripe width of the high reflectance region 72 and the low reflectance region 74 may vary for each pair of the high reflectance region 72 and the low reflectance region 74, or may be equal for all the patterns. However, if it is difficult to recognize the difference of the stipe widths due to the resolution of the LiDAR sensor 36, the stripe widths of all of the high reflectance regions 72 and the low reflectance regions 74 may be equal.

The stop target 70 is made of a resin plate, for example, to which a tape reflector (reflective tape) is attached. A resin reflector may be used in place of the resin plate. A region of the stop target 70 where the tape reflector is attached is the high reflectance region 72, and a region without the tape reflector is the low reflectance region 74.

The reflectance of the high reflectance region 72 and the reflectance of the low reflectance region 74 are determined based on the difference in reflectance at the distance r to the stop target 70, where the precise docking control starts, for example. The difference in reflectance between adjacent reflectance regions, such as the difference in reflectance between the high reflectance region 72 and the low reflectance region 74 in the example illustrated in FIG. 7, should be 10% or greater, for example, when the LiDAR sensor 36 emits infrared laser light to the stop target 70 at the distance r.

Each of the reflectance regions (the high reflectance region 72 and the low reflectance region 74 in the example illustrated in FIG. 7) may be in a color other than black which is known to have high absorptance of infrared ray. If the LiDAR data analyzer 52 (see FIG. 6) determines reflectance 0%, as will be described below, there is a possibility that the stop target 70 is segmented into a plurality of clusters. For example, if the reflectance of the low reflectance region 74 is around 0%, it is possible that the high reflectance regions 72 may be grouped into different clusters. The high reflectance regions 72 and the low reflectance regions 74 having colors other than black inhibit segmentation of the stop target 70 into a plurality of clusters as described above.

The stop target 70 may have a circular cylindrical shape, as illustrated in FIG. 7. The stop target 70 having a circular cylindrical shape inhibits variation in a projection area caused by the imaging angle of the stop target 70. Each of the high reflectance region 72 and the low reflectance region 74 may be disposed along the entire circumference of the side face of the circular cylinder.

Figure 8:
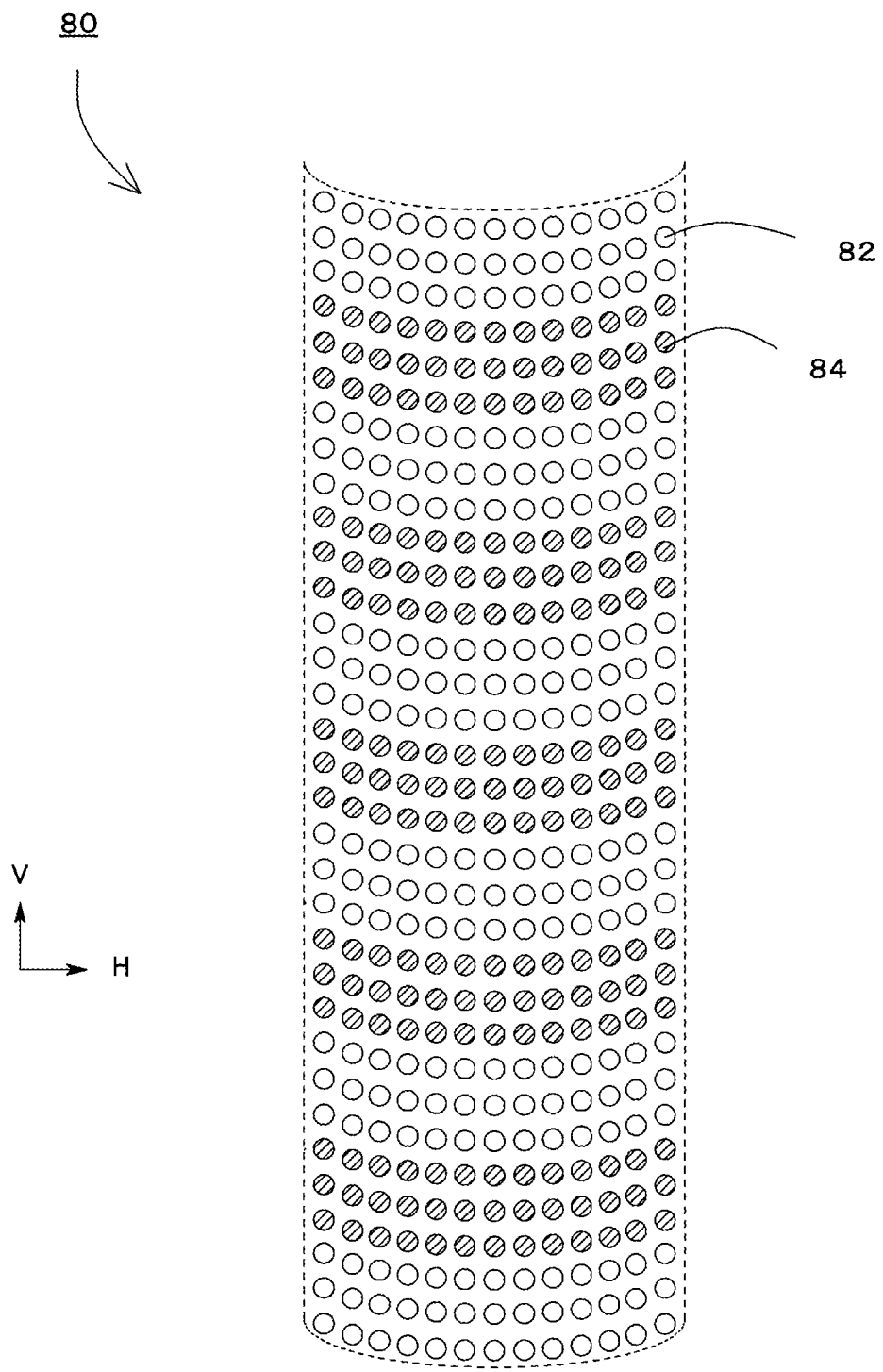
FIG. 8 illustrates a reference cluster corresponding to a stop target according to an embodiment.

FIG. 8 illustrates a reflectance distribution obtained when the stop target 70 illustrated in FIG. 7 is irradiated with infrared laser. This corresponds to the shape of the stop target 70; that is, the frontal shape of the stop target 70 viewed from the LiDAR sensor 36, and to the reflectance distribution on the plane, when the infrared laser light is scanned three-dimensionally (horizontally and vertically) by the LiDAR sensor 36. The reflectance distribution and the shape illustrated in FIG. 8 are prestored in the reference cluster memory unit 58 (see FIG. 6) as the reference cluster 80 representing the stop target.

FIG. 8 shows the reflection points by circles; an unhatched circle represents a reflection point with a relatively high reflectance and a hatched circle represents a reflection point with a relatively low reflectance. A high reflectance region 82 in the reference cluster 80 corresponds to the high reflectance region 72 in the stop target 70. Similarly, a low reflectance region 84 in the reference cluster 80 corresponds to the low reflectance region 74 in the stop target 70.

Thus, the reference cluster 80 also has a stripe configuration including repetition of patterns of a plurality of regions with the reflectance with respect to the laser light being different between adjacent regions. FIG. 8, for example, includes a stripe configuration including the high reflectance regions 82 and the low reflectance regions 84 that are alternately arranged repeatedly. More specifically, in the cluster 80, the high reflectance regions 82 and the low reflectance regions 84 that extend horizontally are disposed alternately in the vertical direction in a repeated manner.

The reference cluster 80 also has, corresponding to the stop target 70 illustrated in FIG. 7, a surface shape of a side face of the circular cylinder as viewed from the front. Referring to FIG. 7, for example, the surface shape as viewed from front represents a surface shape of the side face of 0° to 180° of the circular cylinder, as indicated by a region A 1.

As described above, the stop target 70 having a circular cylindrical shape reduces variation of the projection area depending on the imaging angle of the stop target 70. Therefore, the surface shape of the stop target 70 of 0° to 180° of the circular cylinder side face; that is, the surface shape of the circular cylinder side face as viewed from the front, is itself sufficient for the reference cluster 80 of the stop target 70; it is not necessary to alter the shape of the reference cluster 80 for each imaging angle, for example.

Figure 9:
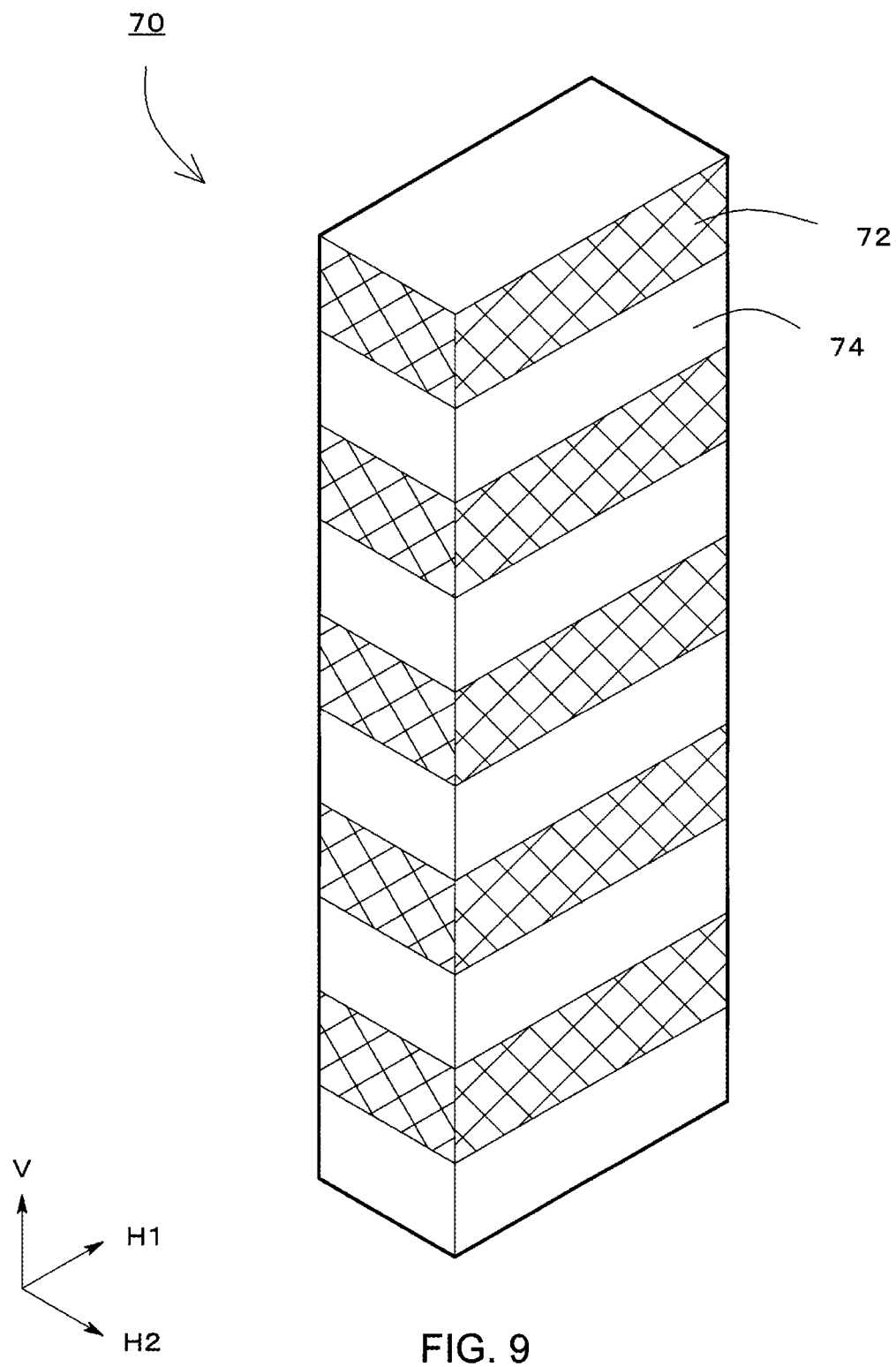
FIG. 9 illustrates another example stop target according to the present embodiment.

FIG. 9 illustrates another example stop target 70 according to the present embodiment. In this example, the stop target 70 has a prism pillar shape. The stop target 70 is a rectangular parallelepiped, for example, and has a plane with a relatively larger area (a plane in parallel to axis H1) facing the vehicle 10.

Figure 10:
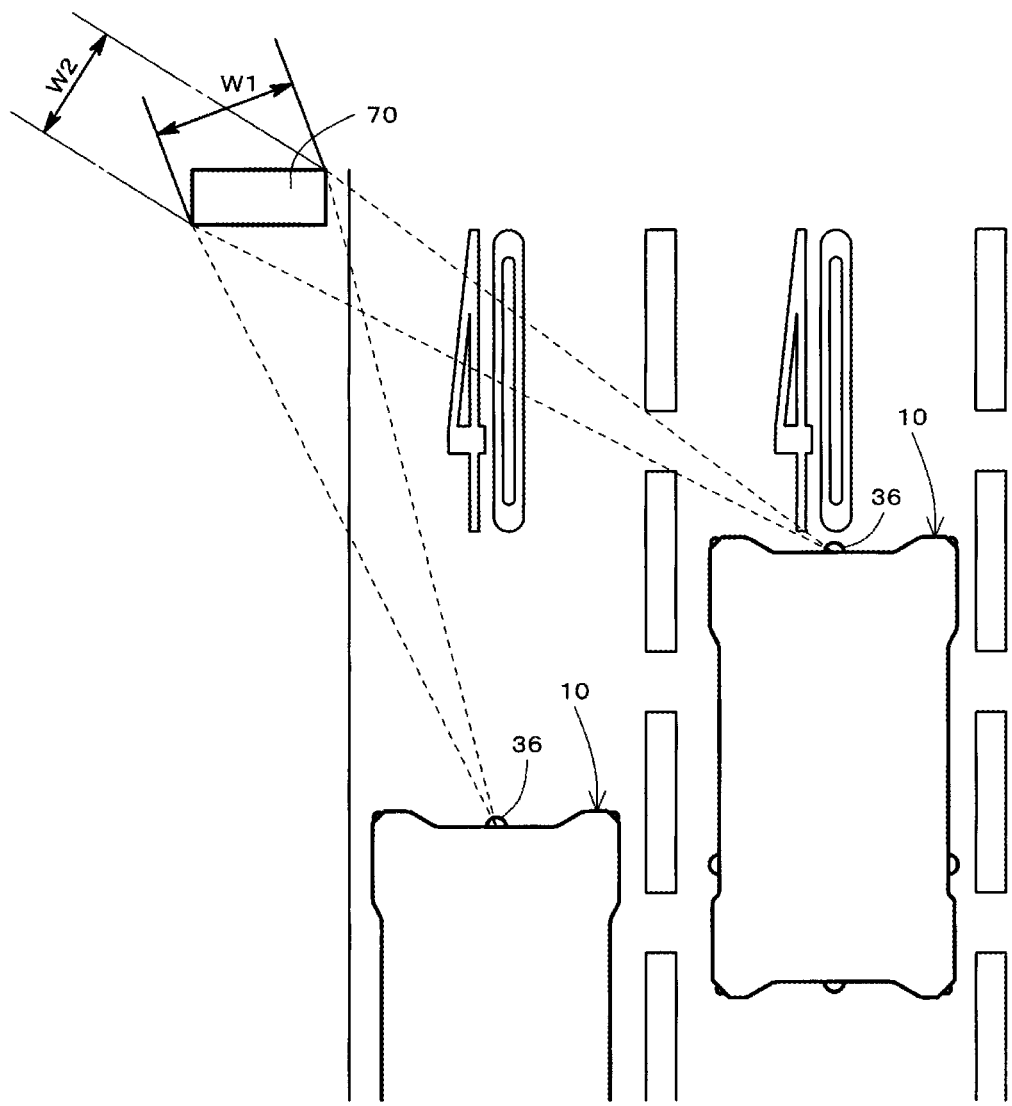
FIG. 10 is a diagram for explaining a change in the projection area of the stop target depending on the angle of the stop target.

When such a stop target 70 having a prism pillar shape is set on a footpath, the projection width (W1, W2) of the stop target 70 varies depending on the angle (imaging angle) of the LiDAR sensor 36 with respect to the stop target 70, as illustrated in FIG. 10. Therefore, a plurality of reference clusters 80 having different projection widths in accordance with the imaging angle are stored in the reference cluster memory unit 58 (see FIG. 6).

Figure 11:
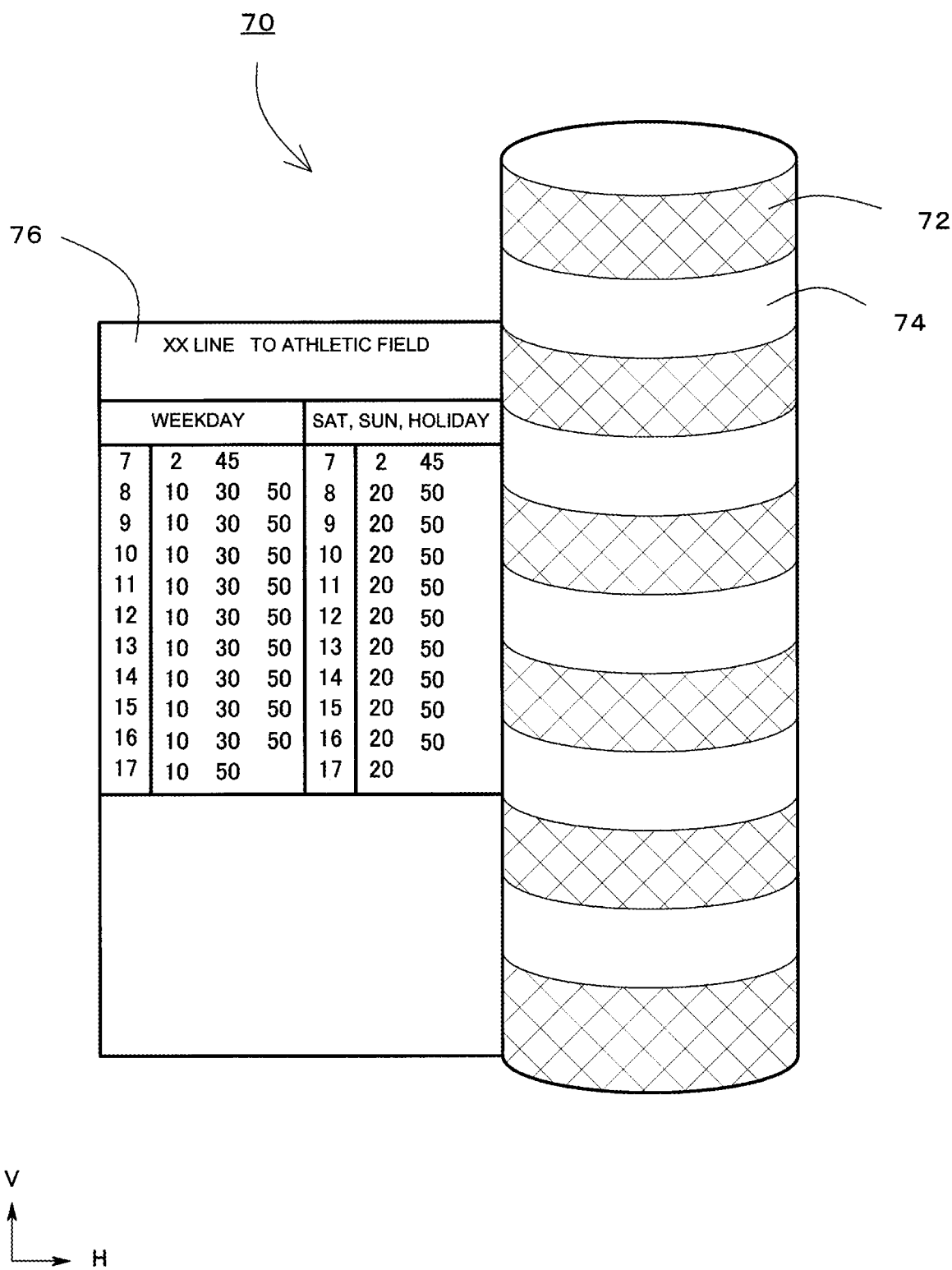
FIG. 11 illustrates another example stop target according to an embodiment.

FIG. 11 illustrates an example stop target 70 with a time table plate 76 attached thereto. The time table plate 76 shows times indicating scheduled arrival time of the vehicle 10. The time table plate 76 is disposed to avoid the high reflectance region 72 and the low reflectance region 74 of the stop target 70. The position of the time table plate 76 is determined such that the high reflectance region 72 and the low reflectance region 74 do not overlap the time table plate 76 along a direction in which the footpath extends.

Figure 12:
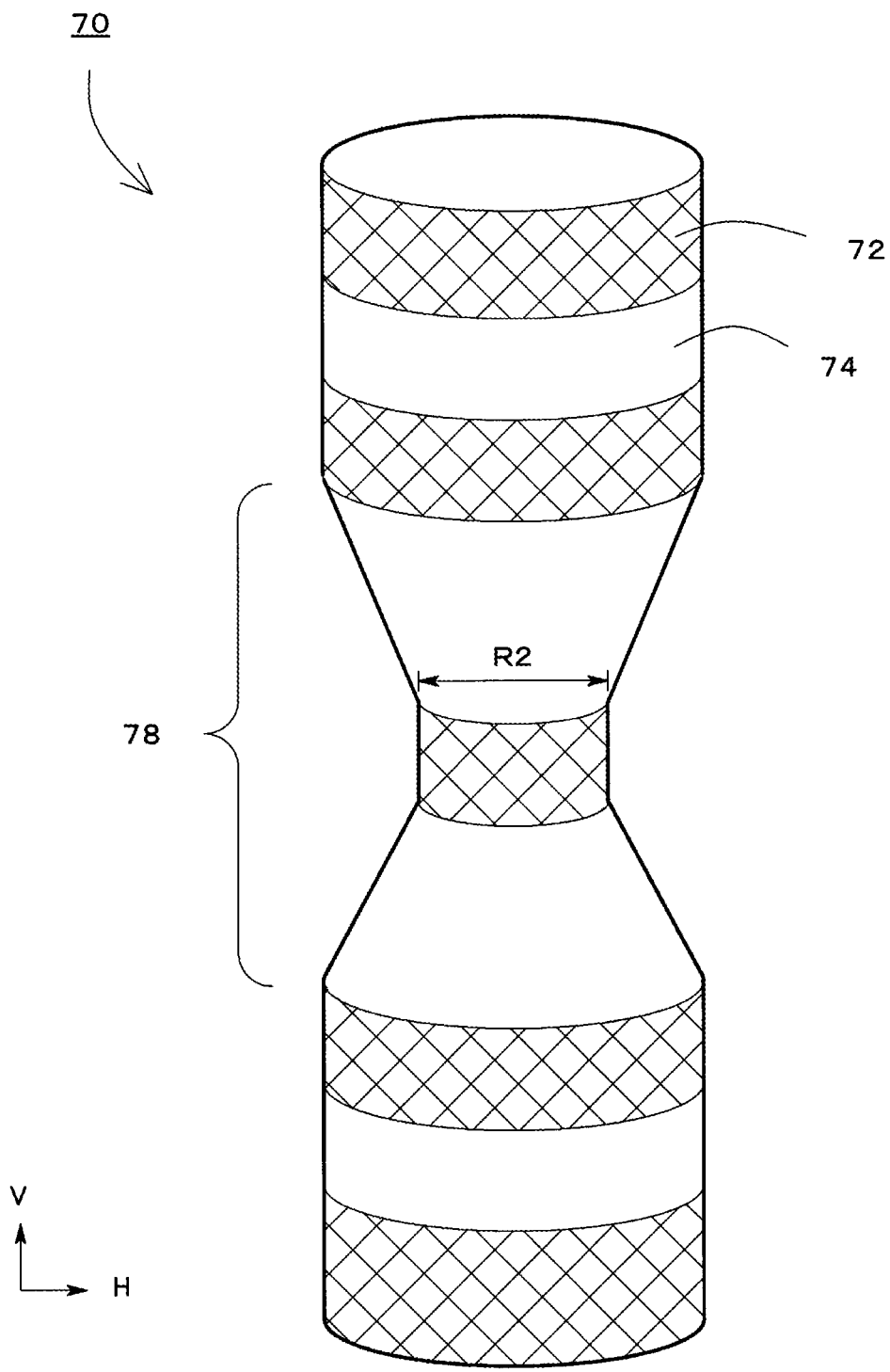
FIG. 12 illustrates another example stop target according to an embodiment.

FIG. 12 illustrates a still another example stop target 70 according to the present embodiment. In this example, the stop target 70 includes, in its center part in the height direction, a narrow part 78 having a relatively smaller diameter as compared to regions above and below. Such a unique shape makes it easy to discriminate the stop target 70 from surrounding structures, passengers, and other objects.

When the vehicle 10 approaches the stop target 70, for example, the location of the stop target 70 can be detected with higher accuracy by using the narrow part 78 with a relatively smaller diameter as a reference than by using a part with a relatively larger diameter as a reference. Further, the narrow part 78 may be set at a height level which is equal to that of the LiDAR sensor 36 of the vehicle 10.

The diameter R2 of the narrow part 78 is determined, using the distance r from the vehicle 10 (more specifically, from the LiDAR sensor 36) where the precise docking control starts to the stop target 70 and the horizontal resolution $\alpha$ of the LiDAR sensor 36, as $R2 \geq 2r \times \tan(\alpha/2)$.

While FIG. 7, FIG. 9, FIG. 11, and FIG. 12 illustrate the stripe configuration of the stop target 70 including the high reflectance region 72 and the low reflectance region 74, and the corresponding reference cluster 80 includes the stripe configuration having the high reflectance region 82 and the low reflectance region 84, the stop target 70 and the reference cluster 80 are not limited to these examples.

Figure 18:
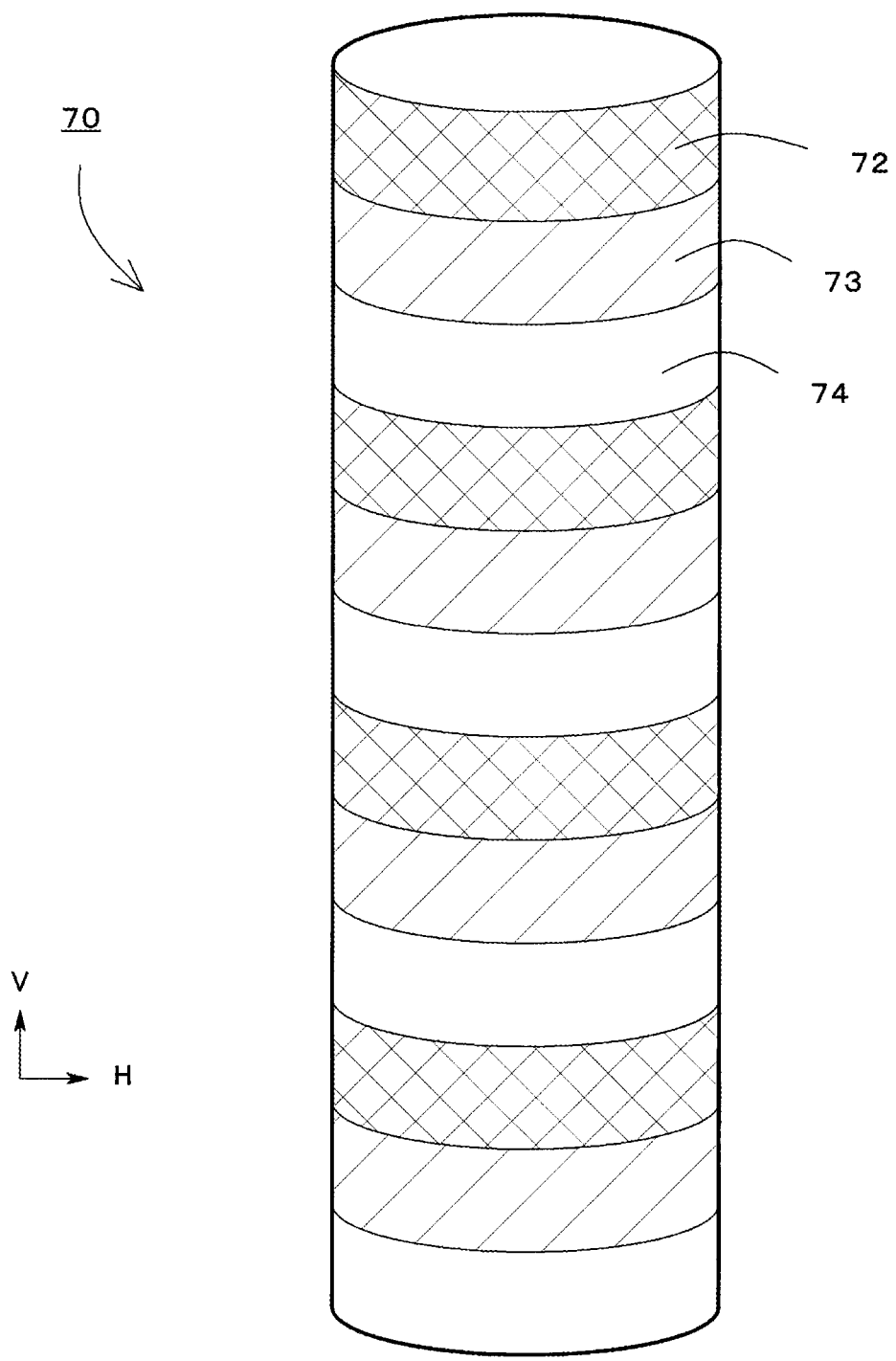
FIG. 18 illustrates another example stop target according to an embodiment.

Specifically, as the stop target 70 and the reference cluster 80 are only required to have a stripe configuration including repeated patterns of a plurality of regions with adjacent regions having different reflectances with respect to laser light, they may have a stripe configuration of three-color stripes, as illustrated in FIG. 18, for example. In this example, the stop target 70 has a stripe configuration including an intermediate reflectance region 73 between the high reflectance region 72 and the low reflectance region 74. The relationship among the reflectances of these regions is as follows: high reflectance region 72>intermediate reflectance region 73>low reflectance region 74. Accordingly, the reference cluster 80 also has a stripe configuration including an intermediate reflectance region between the high reflectance region 82 and the low reflectance region 84.

Figure 19:
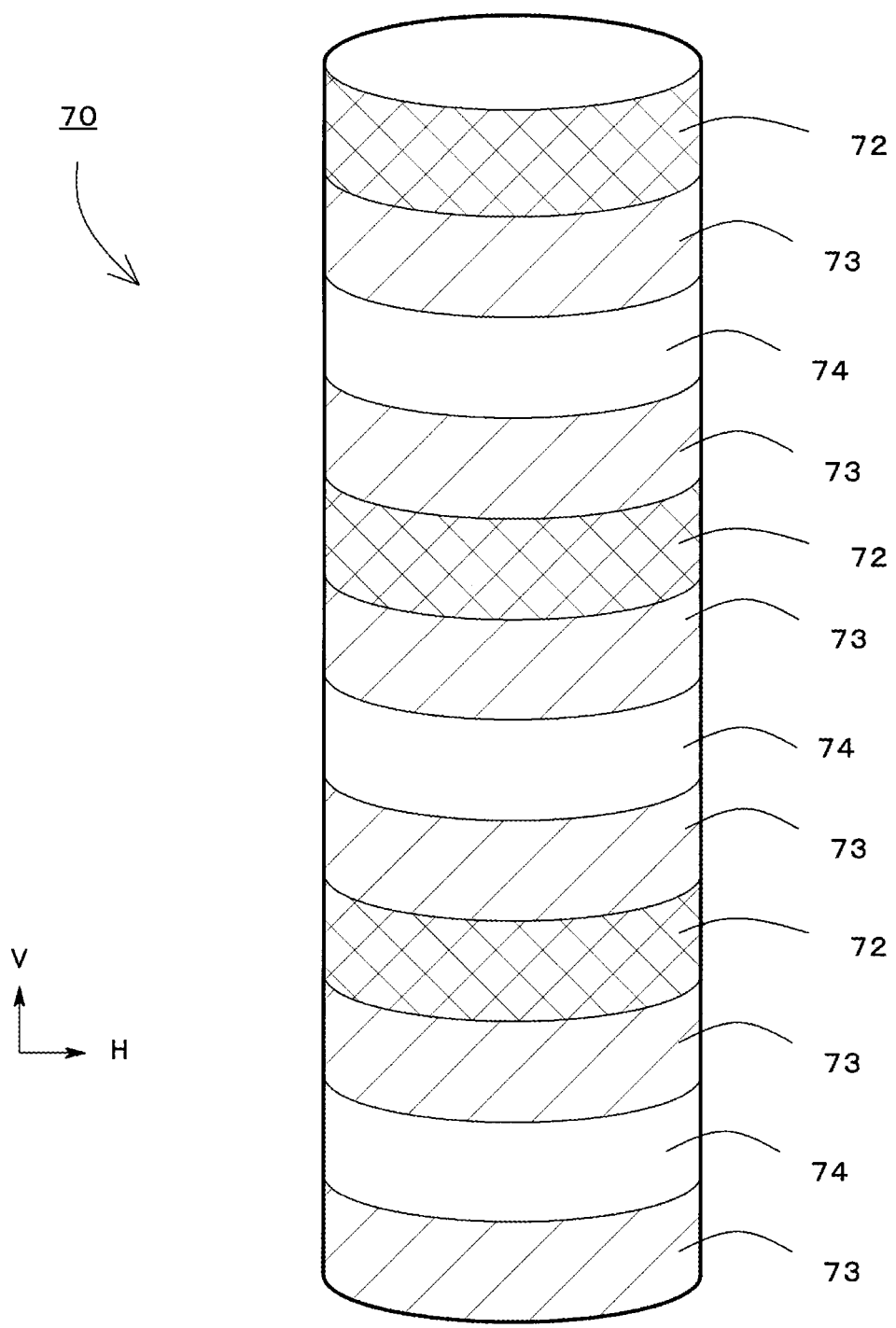
FIG. 19 illustrates another example stop target according to an embodiment.

In the stop target 70, a single pattern may include an identical reflectance region a plurality of times. For example, as illustrated in FIG. 19, the stop target may have a stripe configuration including repeated patterns each formed of four reflectance regions including the high reflectance region 72, the intermediate reflectance region 73, the low reflectance region 74, and the intermediate reflectance region 73 in this order. The reference cluster 80 may accordingly have a stripe configuration including repeated patterns each formed of four reflectance regions including the high reflectance region 82, the intermediate reflectance region 73, the low reflectance region 84, and the intermediate reflectance region 73 in this order.

Automated Driving Control

Referring to FIG. 6, automated driving control performed by the driving control apparatus of the vehicle 10 will be described. As automated driving control is known, the following description especially refers to features related to the precise docking control start determination flow which will be described below.

The dynamic map 22 which is a three-dimensional map and the navigation system 24 are used to perform location estimation of the vehicle 10. The navigation system 24 which is a satellite positioning system transmits to the vehicle location estimator 54 information concerning latitude and longitude of vehicle 10. Further, the dynamic map 22 transmits to the vehicle location estimator 54 map data of a location corresponding to the information of the latitude and longitude of the vehicle 10. Consequently, the location of the vehicle 10 within a range of errors of satellite positioning (e.g., ±10 cm) is estimated.

The vehicle location estimator 54 further acquires three-dimensional point group data (scan data) of the vehicle 10 and its peripheral region from the LiDAR sensor 36. FIG. 15 illustrates example three-dimensional point group data. The location of the vehicle 10 is estimated with an error which is less than an error of satellite positioning, by matching the three-dimensional point group data and the three-dimensional map data from the dynamic map 22.

Figure 14:
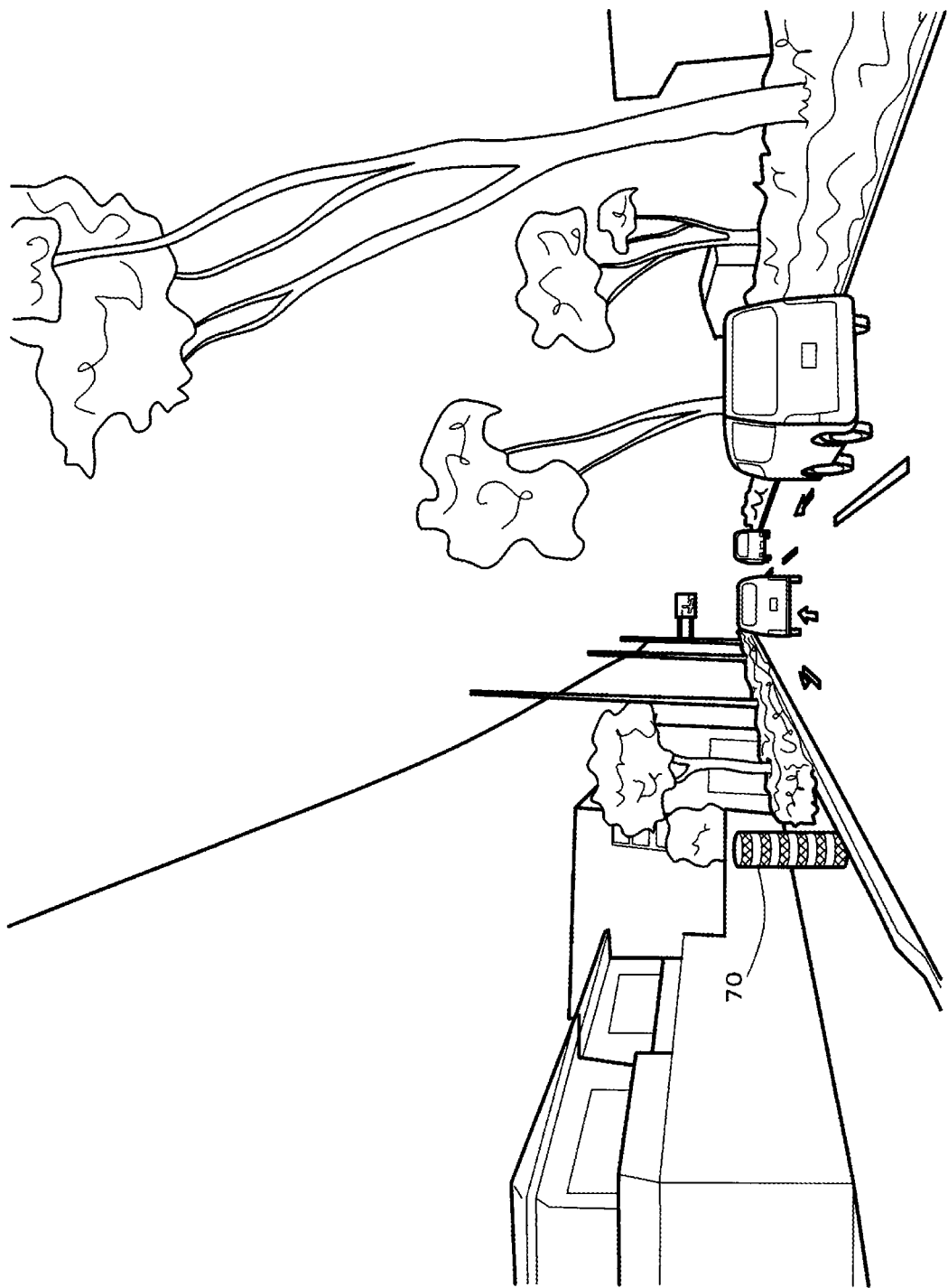
FIG. 14 illustrates an example image captured by a camera.
Figure 17:
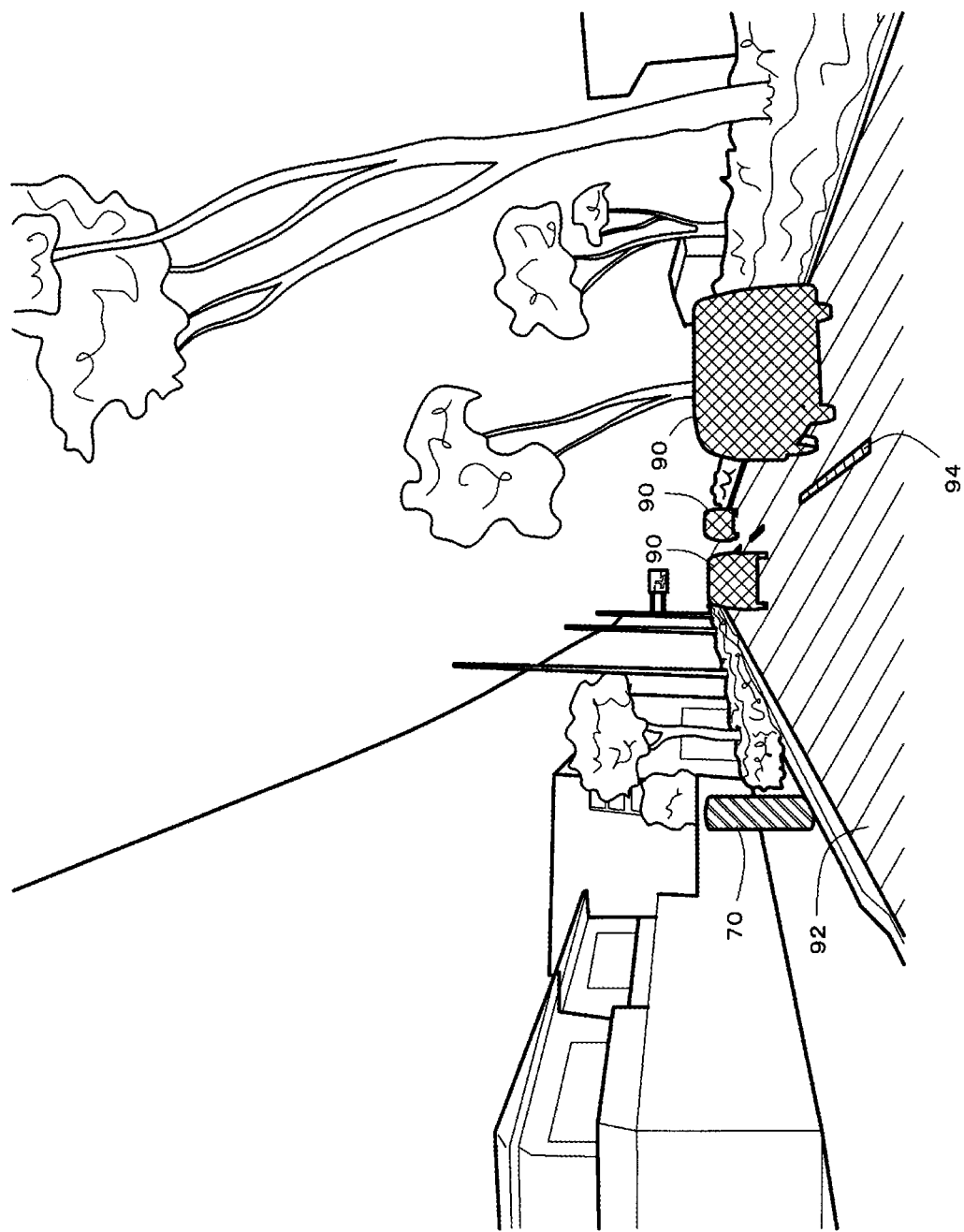
FIG. 17 illustrates an image after recognition of objects.

The imaging data analyzer 50 acquires a captured image illustrated in FIG. 14, which is captured by the camera 34. The imaging data analyzer 50 further detects objects within the image according to a known deep learning method such as SSD (Single Shot Multibox Detector) and YOLO (You Only Look Once) using supervised learning, and recognizes their attributes (vehicles, passengers, structures, and the like). For example, as illustrated in FIG. 17, the imaging data analyzer 50 recognizes from the captured image the stop target 70, vehicles 90, a footpath surface 92, and a traffic lane 94.

The LiDAR data analyzer 52 acquires the three-dimensional point group data (see FIG. 15) from the LiDAR 36. The LiDAR data analyzer 52 further executes clustering for grouping the three-dimensional points into at least one cluster.

While FIG. 15 shows the vehicles and the structures with dashed lines so that the correspondence between the point group and the object can be understood, these dashed lines are not actually shown. The LiDAR data analyzer 52 therefore segment the three-dimensional points into certain point groups for clustering. For clustering, known methods may be used; for example, there is used Euclidean clustering that uses the Euclidean distance of each reflection point for grouping points with similar Euclidean distances into a cluster. In the example illustrated in FIG. 16, for example, the three-dimensional points are grouped into clusters CL1 to CL13 by clustering.

The automated driving controller 60 uses the captured image analyzed by the imaging data analyzer 50 and object information included in the image, the clustered three-dimensional point group data analyzed by the LiDAR data analyzer 52, and the vehicle location information estimated by the vehicle location estimator 54, to perform driving control of the vehicle 10.

By superposing the captured image and the three-dimensional point group data, for example, there can be determined information concerning an object, such as what type of attribute it has and its distance from the vehicle 10. Using this superposing information, the automated driving controller 60 controls the steering mechanism 26, the braking mechanism 27, and the driving mechanism 28.

In precise docking control, for example, the steering angle and speed of the vehicle 10 are determined based on the distance to the stop target 70, and the automated driving controller 60 transmits a corresponding steering instruction, braking instruction, and driving instruction to the steering mechanism 26, the braking mechanism 27, and the driving mechanism 28, respectively. This control finally enables the vehicle 10 to stop beside the stop target 70.

Precise Docking Control Start Determination Flow

FIG. 13 illustrates a precise docking control start determination flow according to the present embodiment. Precise docking control of a vehicle is triggered by recognition of the stop target 70. According to the illustrated flow, whether to start the precise docking control is determined based on whether or not the stop target 70 has been recognized.

Further, as will be described below, according to the illustrated flow, in recognizing the stop target 70, analysis of the three-dimensional point group data using the LiDAR sensor 36, unlike image recognition using the captured image from the camera 34, is used to recognize the stop target 70.

The flow illustrated in FIG. 13 starts when the vehicle 10 enters a "bus stop vicinity area", which is an area in the vicinity of the stop target 70. The bus stop vicinity area may be a region within a 500 m radius of the stop target 70.

Under automated driving, for example, a destination and a route to the destination are determined in advance. The location of the stop target 70 along the route is further determined using the dynamic map 22. In addition, based on the determined location of the stop target 70 (its location on the dynamic map) and the vehicle location estimation described above, the distance between the vehicle 10 and the stop target 70 can be estimated.

However, as this estimation is a rough location estimation including errors based on the position information accuracy of the dynamic map 22 and errors of satellite positioning, the bus stop vicinity area is set to the order greater than the order of these errors. For example, if the errors of the dynamic map 22 and the satellite positioning are of the order of 10 cm, the bus stop vicinity area is set to the order of 100 m, which can disregard these errors.

Upon starting the precise docking control start determination flow, the LiDAR data analyzer 52 acquires three-dimensional point group data from the LiDAR sensor 36 (S10). The LiDAR data analyzer 52 further executes clustering of the acquired three-dimensional point group data (S12). The clustered three-dimensional point group data are transmitted to the precise docking control start determination unit 56.

Figure 16:
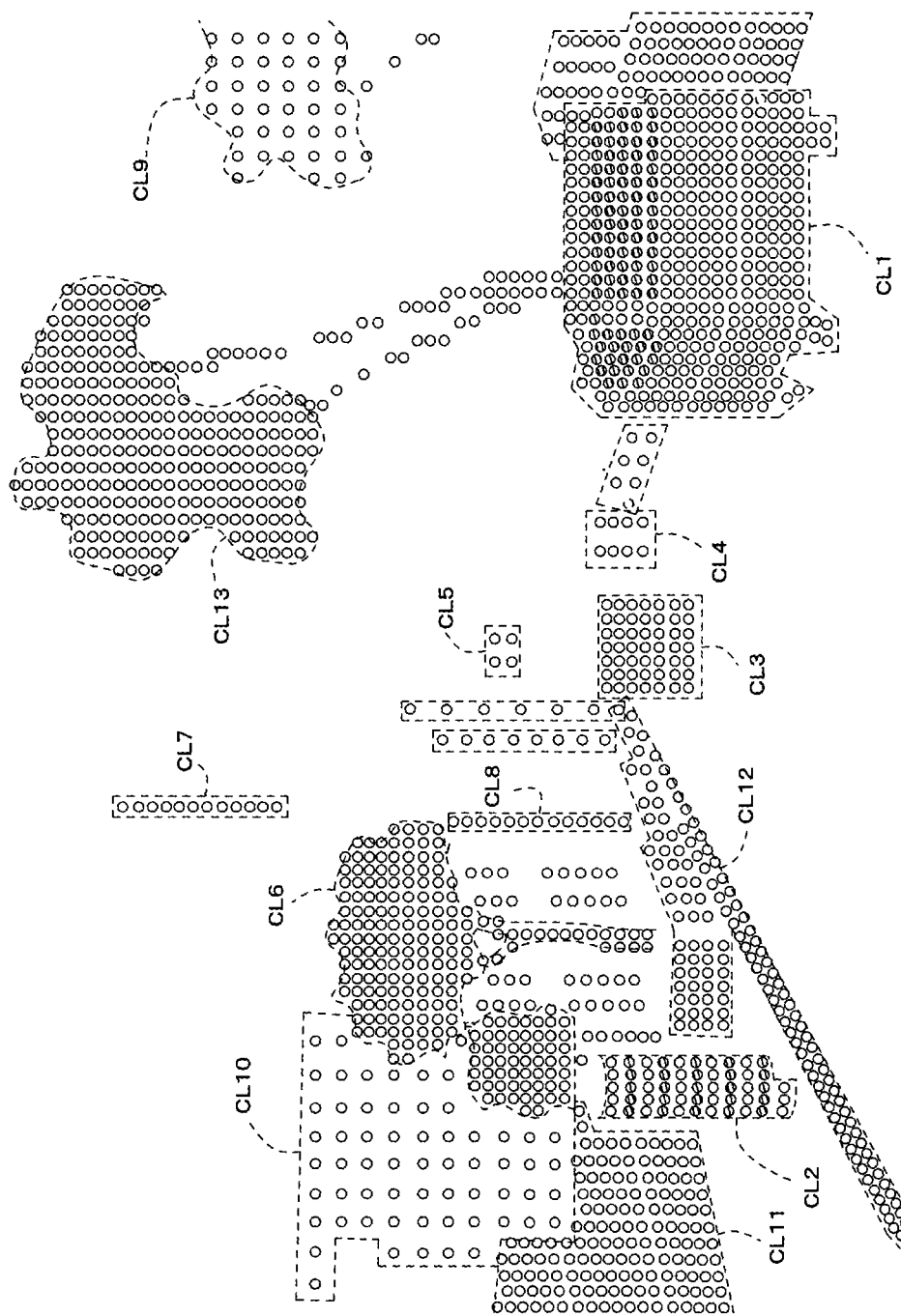
FIG. 16 illustrates a clustering process of three-dimensional point group data.

The precise docking control start determination unit 56 compares shapes and reflectance distributions between at least one cluster acquired by the LiDAR data analyzer 52 and the reference cluster 80 that represents the stop target 70 to determine whether or not the at least one cluster includes the stop target 70. Specifically, the precise docking control start determination unit 56 confirms the number n of the obtained clusters (S14), and extracts the first cluster (k=1) from the plurality of clusters (S16). For example, cluster CL1 in FIG. 16 is extracted.

The precise docking control start determination unit 56 then compares the k-th cluster CL_k with the reference cluster 80 (see FIG. 8) stored in the reference cluster memory unit 58 to determine whether or not these clusters match (S18 to S24).

The degree of match based on this comparison may be determined using a known method such as template matching, for example. Specifically, the reference cluster 80 is used as a template.

First, the shapes are compared between the cluster CL_k and the reference cluster 80 (S18 and S20). In this comparison and in comparing the reflectance distributions in the later stage, the reference cluster 80 may be corrected. For example, the precise docking control start determination unit 56, based on the distance between the cluster CL_k and the LiDAR sensor 36 when the three-dimensional point group data were acquired, enlarges or reduces the reference cluster 80. At this time, the reflection points which may be included in the stripe widths of the high reflectance region 82 and the low reflectance region 84, respectively, of the reference cluster 80 are increased or decreased.

If in step S20 the shape of the cluster CL_k and the shape of the reference cluster 80 do not match, it is determined that the cluster CL_k does not correspond to the stop target 70. Therefore, after determining whether or not the cluster counter k reaches the maximum value n (S26), the cluster counter k, not reaching the maximum value n, is incremented (S28) and the next cluster is set as a comparison target.

If in step S20 it is determined that the shape of the cluster CL_k and the shape of the reference cluster 80 match, the two-dimensional reflectance distributions of these clusters are further compared (S22 and S24). For example, the arrangement pattern of the reflection point regions having relatively high reflectance and the reflection point regions having relatively low reflectance in the cluster CL_k and the arrangement pattern of the high reflectance region 82 and the low reflectance region 84 in the reference cluster 80 are compared.

If it is determined that the cluster CL_k and the reference cluster 80 do not match according to comparison of the reflectance distribution, it is then determined that the cluster CL_k does not correspond to the stop target 70. Therefore, after determining whether or not the cluster counter k reaches the maximum value n (S26), the cluster counter k, not reaching the maximum value n, is incremented (S28), and the next cluster is set as a comparison target.

If in step S24 it is determined that the reflectance distribution of the cluster CL_k and the reflectance distribution of the reference cluster 80 match, the precise docking control start determination unit 56 outputs a start instruction for the precise docking control to the automated driving controller 60 (S34). This changes the driving control for the vehicle 10 from normal travelling control to the precise docking control to the stop target 70.

If in step S26 it is determined that all of the clusters, clusters CL_1 to CL_n, in the three-dimensional point group data do not correspond to the reference cluster 80, the precise docking control start determination unit 56 determines whether or not the vehicle 10 has passed the bus stop vicinity area (S36). This determination is performed using the vehicle location estimation described above, for example.

If in step S36 it is determined that the vehicle 10 stays in the bus stop vicinity area, the precise docking control start determination unit 56 resets the number n of clusters and the cluster counter k (n=0, and k=1, for example) (S30). Further, the LiDAR data analyzer 52 acquires new three-dimensional point group data from the LiDAR sensor 36 to update the three-dimensional point group data to be analyzed (S32). The updated three-dimensional point group data are clustered by the LiDAR data analyzer 52 as described above (S12).

If in step S36 it is determined that the vehicle 10 has passed the bus stop vicinity area, this means that the stop target 70 has not been detected (recognized) over the entire region of the bus stop vicinity area. In this case, the precise docking control start determination unit 56 executes fault processing (S38). For example, the precise docking control start determination unit 56 notifies occupants within the vehicle or a remotely located operator of a message indicating that the stop target 70 could not be recognized.

As described above, the driving control apparatus according to the present embodiment enables recognition of the stop target 70 using the LiDAR sensor 36 alone; that is, without using image recognition by the camera 34.

The driving control apparatus according to the present embodiment is capable of both recognition of the stop target 70 by the camera 34 and recognition of the stop target 70 by the LiDAR sensor 36. Therefore, in addition to the recognition of the stop target 70 by the LiDAR sensor 36 alone as illustrated in FIG. 13, the recognition of the stop target 70 by the camera 34 may also be used to increase the detection accuracy of the stop target 70.

For example, the recognition of the stop target 70 by the LiDAR sensor 36 and the recognition of the stop target 70 by the camera 34 may be used under AND condition or OR condition. When the AND condition is used, for example, the fault processing described above may be executed if the stop target 70 cannot be recognized by at least one of the LiDAR sensor 36 or the camera 34. On the other hand, when the OR condition is used, the precise docking control may be started if the stop target 70 can be recognized by at least one of the LiDAR sensor 36 or the camera 34.

While, in the above example, the exposed face of the stop target 70 has a stripe configuration, this may raise a possibility that a passenger wearing a shirt with horizontal stripe patterns, for example, is confused with the stop target 70. In such a case, cluster tracking of the automated driving technology is used to determine whether or not the cluster which is recognized as the stop target 70 is moving. If determined to not be moving, the cluster is determined to be the stop target 70. A determination flow using such a tracking may be added to the precise docking control start determination flow illustrated in FIG. 13.

In addition to the stop target 70, an auxiliary target may be disposed along the curb of the footpath. The auxiliary target, similar to the stop target 70, may have a configuration which is recognizable by the LiDAR sensor 36. Specifically, the auxiliary target may have a horizontal stripe configuration including repeated patterns of the high reflectance region 72 and the low reflectance region 74 which are disposed alternately in the vertical direction.

Recognizing the stop target 70 and the auxiliary target disposed along the curb enables recognition of the borderline between the footpath and the roadway. For example, a straight line connecting the stop target 70 and the auxiliary target can be used to recognize the curb which is the borderline between the footpath and the roadway. The present disclosure is not limited to the embodiments described above, and includes all changes and modifications without departing from the technical scope or the essence of the present disclosure defined by the claims.

The invention claimed is:

1. A driving control apparatus for an automated driving vehicle, comprising:
   a LiDAR sensor configured to three-dimensionally scan laser light outward of the vehicle and to receive reflected light;
   an analyzer configured to group three-dimensional points of the reflected light acquired by the LiDAR sensor into clusters; and
   a determination unit configured to compare shapes and reflectance distributions between at least one of the clusters obtained by the analyzer and a reference cluster representing a stop target to determine whether or not the at least one cluster includes the stop target,
   wherein:
   the reference cluster has a stripe configuration including repeated patterns of a plurality of regions in which adjacent regions have different reflectances with respect to the laser light,
   the reference cluster includes, as the stripe configuration, a high reflectance region having a relatively high reflectance with respect to the laser light and a low reflectance region having a relatively low reflectance with respect to the laser light, the high reflectance region and the low reflectance region being alternately arranged repeatedly,
   the reference cluster includes, as the stripe configuration, a horizontal stripe configuration including the high reflectance region and the low reflectance region both extending horizontally, the high reflectance region and the low reflectance region being alternately disposed repeatedly in a vertical direction, and
   the reference cluster has a surface shape of 0° to 180° of a circular cylindrical side face.

* * * * *